(12) United States Patent
Ido et al.

(10) Patent No.: US 12,513,388 B2
(45) Date of Patent: Dec. 30, 2025

(54) IMAGE CAPTURING APPARATUS AND CONTROL METHOD

(71) Applicant: CANON KABUSHIKI KAISHA, Tokyo (JP)

(72) Inventors: Riho Ido, Kanagawa (JP); Toshimichi Ise, Kanagawa (JP); Kazuya Kitamura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 187 days.

(21) Appl. No.: 18/356,340

(22) Filed: Jul. 21, 2023

(65) Prior Publication Data

US 2024/0040231 A1 Feb. 1, 2024

(30) Foreign Application Priority Data

Jul. 26, 2022 (JP) ................... 2022-118873

(51) Int. Cl.
*H04N 23/63* (2023.01)
*H04N 23/62* (2023.01)

(52) U.S. Cl.
CPC ........... *H04N 23/631* (2023.01); *H04N 23/62* (2023.01); *H04N 23/633* (2023.01)

(58) Field of Classification Search
CPC ...... H04N 23/62; H04N 23/63; H04N 23/631; H04N 23/633; H04N 23/662; G06F 3/04847
See application file for complete search history.

(56) References Cited

U.S. PATENT DOCUMENTS

| 4,695,905 A | 9/1987 | Utsugi | |
| 11,221,707 B2* | 1/2022 | Nishimura | H04N 23/63 |
| 2004/0046869 A1 | 3/2004 | Dibella | |
| 2009/0244357 A1* | 10/2009 | Huang | H04N 23/635 |
| | | | 348/E5.024 |
| 2011/0012849 A1* | 1/2011 | Cho | G06F 1/3203 |
| | | | 345/173 |
| 2012/0113056 A1* | 5/2012 | Koizumi | H04N 23/635 |
| | | | 345/175 |
| 2012/0146924 A1* | 6/2012 | Inoue | H04N 23/62 |
| | | | 345/173 |
| 2012/0274808 A1* | 11/2012 | Chong | H04N 23/631 |
| | | | 348/E9.053 |

(Continued)

FOREIGN PATENT DOCUMENTS

| JP | 2004048229 A | 2/2004 |
| JP | 2021-145191 A | 9/2021 |

OTHER PUBLICATIONS

The above documents were cited in a British Search Report issued on Jan. 31, 2024, which is enclosed, that issued in the corresponding British Patent Application No. GB2310998.6.

*Primary Examiner* — Daniel M Pasiewicz
(74) *Attorney, Agent, or Firm* — Cowan, Liebowitz & Latman, P.C.

(57) ABSTRACT

An image capturing apparatus comprises an image capturing unit, a detection unit configured to detect a user operation performed with respect to image information being displayed on a display unit, and a control unit configured to disable the user operation when at least externally inputted predetermined image information is being displayed on the display unit.

18 Claims, 21 Drawing Sheets

(56) References Cited

U.S. PATENT DOCUMENTS

| | | | | |
|---|---|---|---|---|
| 2014/0340557 A1* | 11/2014 | Ishihara | ............... | H04N 23/51 |
| | | | | 348/333.01 |
| 2016/0198080 A1* | 7/2016 | Ito | ............... | H04N 23/631 |
| | | | | 348/207.11 |
| 2018/0183993 A1* | 6/2018 | Kobayashi | ............... | G06F 3/04883 |

* cited by examiner

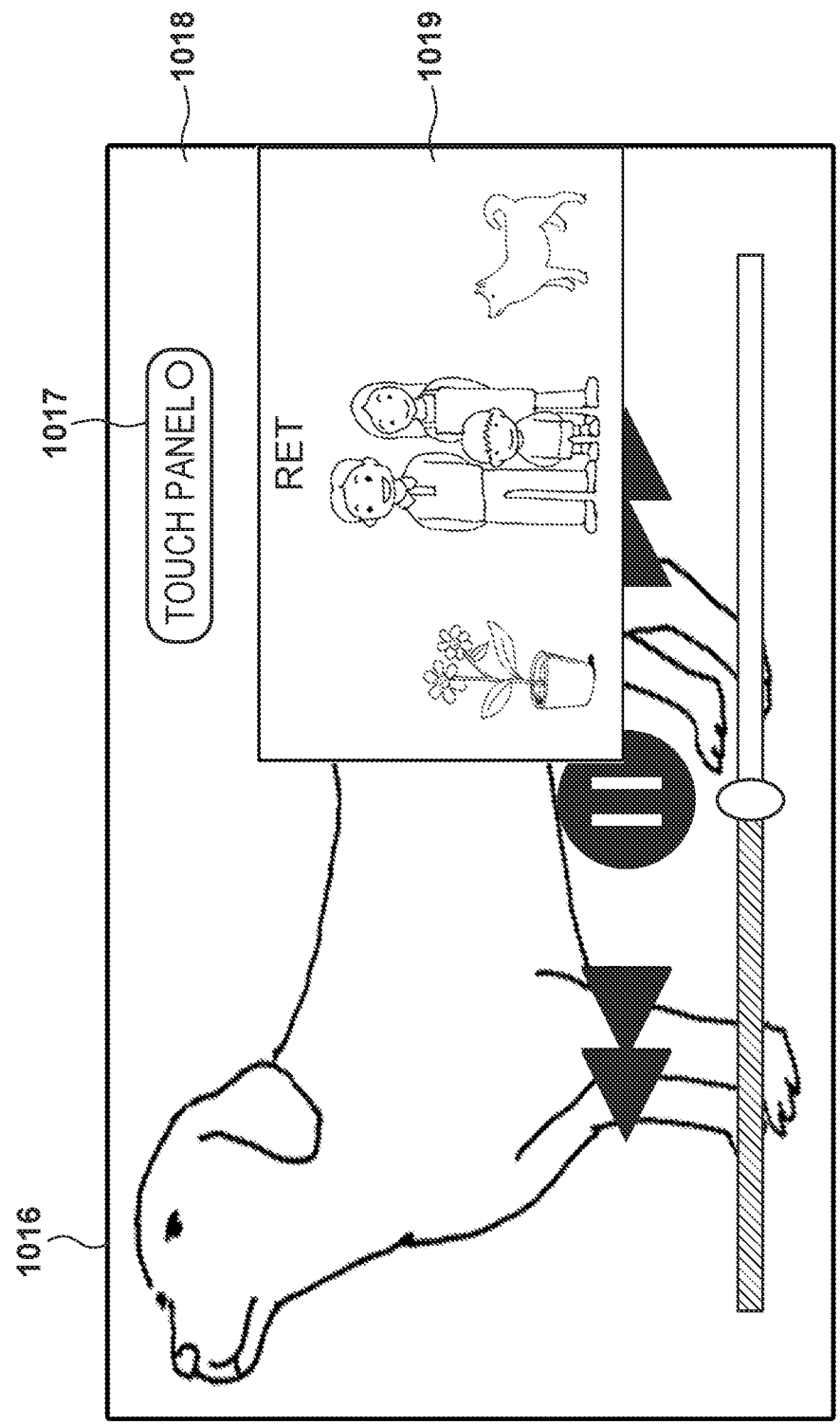

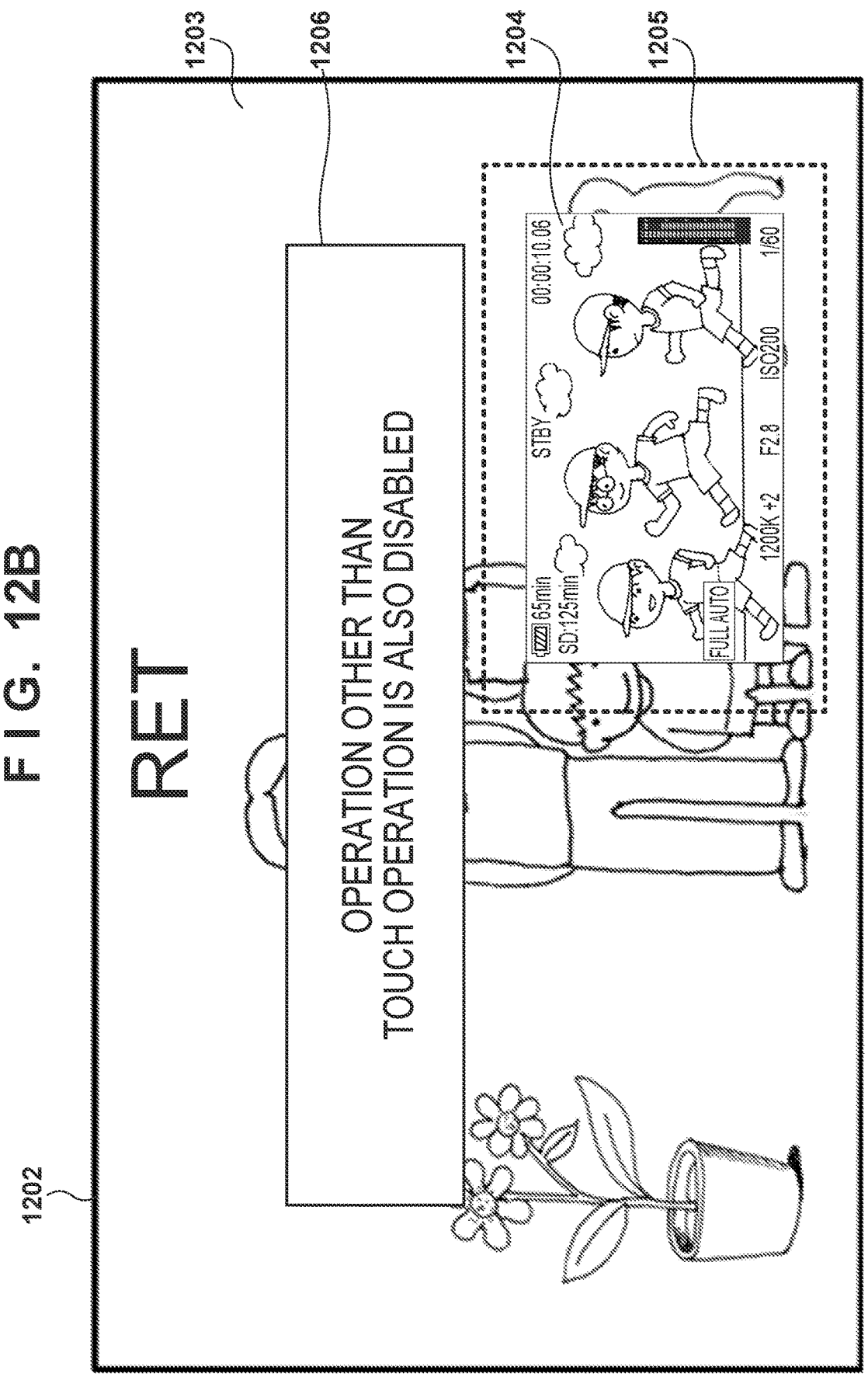

IMAGE CAPTURING APPARATUS AND CONTROL METHOD

BACKGROUND OF THE INVENTION

Field of the Invention

The present invention relates to a technique for preventing processing from being performed according to an erroneous user operation with respect to currently displayed image information.

Description of the Related Art

Japanese Patent Laid-Open No. 2021-145191 describes a method of disabling a touch operation on a display unit when a state in which an eye is close to an eyepiece viewfinder is detected in a digital camera provided with a display unit different from the eyepiece viewfinder and in which a touch operation on the display unit is possible. According to Japanese Patent Laid-Open No. 2021-145191, it is possible to prevent processing which is not intended by the user from being performed due to a user erroneously touching the display unit since a user not being able to see the display unit when a state in which their eye is close to the eyepiece viewfinder is detected.

However, unintended processing may be performed even when the user is able to see the display unit. For example, unintended processing may be performed due to the user erroneously performing an operation on the currently displayed image when the image capturing apparatus allows an image shooting operation even in a state in which an externally inputted image is being displayed on the display unit but does not display a state after the operation on a display screen.

SUMMARY OF THE INVENTION

The present invention has been made in consideration of the aforementioned problems, and realizes a technique for preventing unintended processing from being performed by a user erroneously performing an operation with respect to currently displayed image information.

In order to address the aforementioned problems, the present invention provides an image capturing apparatus comprising: an image capturing unit; a detection unit configured to detect a user operation performed with respect to image information being displayed on a display unit; and a control unit configured to disable the user operation when at least externally inputted predetermined image information is being displayed on the display unit.

In order to address the aforementioned problems, the present invention provides a method of controlling an image capturing apparatus including an image capturing unit and a detection unit configured to detect a user operation performed with respect to image information being displayed on a display unit, the method comprising: disabling the user operation in a case where at least externally inputted predetermined image information is being displayed on the display unit.

In order to address the aforementioned problems, the present invention provides a non-transitory computer-readable storage medium storing a program that when executed on a computer causes the computer to function as an image capturing apparatus comprising: an image capturing unit; a detection unit configured to detect a user operation performed with respect to image information being displayed on a display unit; and a control unit configured to disable the user operation when at least externally inputted predetermined image information is being displayed on the display unit.

According to the present invention, it is possible to prevent unintended processing from being performed by a user erroneously performing an operation with respect to currently displayed image information.

Further features of the present invention will become apparent from the following description of embodiments (with reference to the attached drawings).

BRIEF DESCRIPTION OF THE DRAWINGS

FIGS. 10A to 10E are diagrams illustrating examples of screen displays for when touch operations are enabled in step S906 of FIG. 9 or for when touch operations are disabled in step S907 of FIG. 9.

FIGS. 12A and 12B are diagrams illustrating examples of screen displays for when a user operation is disabled in step S1107 of FIG. 11.

DESCRIPTION OF THE EMBODIMENTS

Figure 1:
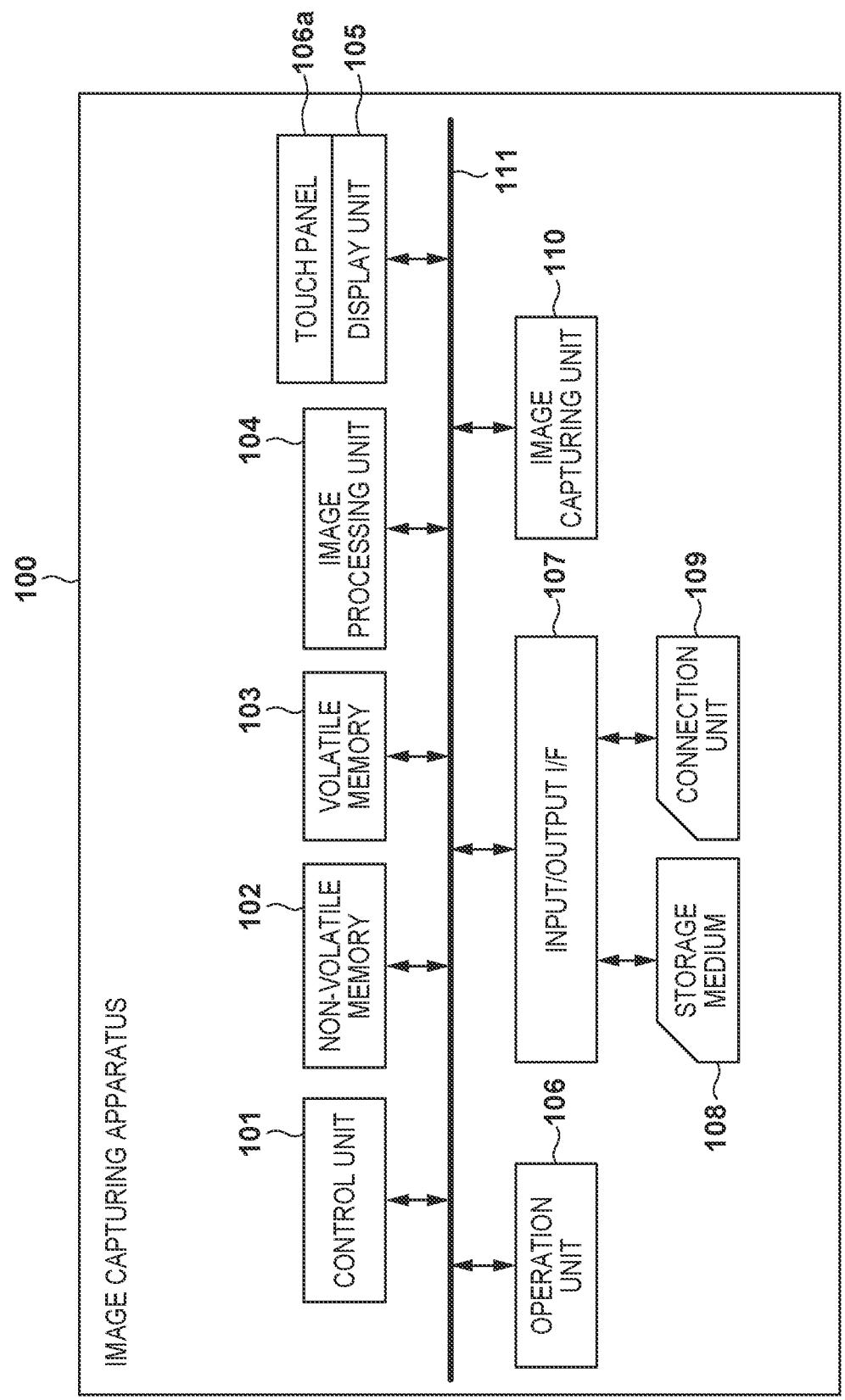
FIG. 1 is a block diagram illustrating a configuration of an image capturing apparatus according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted. Each of the embodiments of the present invention described below can be implemented solely or as a combination of a plurality of the embodiments or features thereof where necessary or where the combination of elements or features from individual embodiments in a single embodiment is beneficial.

Hereinafter, an embodiment in which an image capturing apparatus according to the present invention is applied to a digital video camera used at image shooting locations and the like will be described in detail with reference to accompanying drawings. The present invention is not limited to a digital camera and is applicable to a smartphone, which is a type of mobile phone; a tablet device; and the like.

Configuration of Image Capturing Apparatus 100

First, a configuration and functions of an image capturing apparatus 100 according to the present embodiment will be described with reference to FIG. 1.

FIG. 1 is a block diagram illustrating a configuration of the image capturing apparatus 100 according to the present embodiment.

The image capturing apparatus 100 includes a control unit 101, a non-volatile memory 102, a volatile memory 103, an image processing unit 104, a display unit 105, an operation unit 106, an input/output I/F 107, and an image capturing unit 110. The components of the image capturing apparatus 100 are each connected by an internal bus 111 so as to be capable of transmitting and receiving data to each other. The image capturing apparatus 100 operates as a control apparatus capable of displaying images, an on-screen display (OSD), and a graphical user interface (GUI) and controlling an expansion apparatus 200 to be described later, connected to the image capturing apparatus 100.

The control unit 101 is a computational processor (a CPU or an MPU) for comprehensively controlling the entire image capturing apparatus 100 and controls each of the aforementioned components by executing a program stored in the non-volatile memory 102 to be described later. Instead of the control unit 101 controlling the entire apparatus, a plurality of hardware pieces may control the entire apparatus by distributing processing.

The non-volatile memory 102 is a ROM and is used as a storage region for storing constants, programs, and the like for operation of the control unit 101. The programs are programs for executing control processing to be described later in the present embodiment.

The volatile memory 103 is a RAM and is used as a working region for loading constants, variables, computer programs read out from the non-volatile memory 102, and the like for operation of the control unit 101.

The image processing unit 104 executes various types of image processing on image data captured by the image capturing unit 110, as image data stored in the non-volatile memory 102 or a storage medium 108, image data externally inputted via the input/output OF 107, and the like under the control of the control unit 101. The image processing unit 104 generates an image file by compressing and encoding still image data on which image processing has been performed, according to a JPEG format or the like or by encoding moving image data with a moving image compression method, such as an MP4 format, and stores the image file in the storage medium 108. The processing to be performed by the image processing unit 104 includes A/D conversion processing for converting analog signals into digital signals and D/A conversion processing for converting digital signals into analog signals. Also, image processing includes encoding processing, compression processing, decoding processing, enlargement/reduction (resizing) processing, noise reduction processing, and color conversion processing for image data. The image processing unit 104 may be configured by a dedicated circuit block (graphical processing unit (GPU)) for executing a particular type of image processing. Depending on the type of image processing, it is also possible for the control unit 101 to execute image processing according to a program without using the image processing unit 104.

The display unit 105 includes a display device, such as a liquid crystal display or an organic EL display, and displays information (hereinafter, image information) including images, sounds, an OSD and/or a GUI on a display screen under the control of the control unit 101. The display unit 105 may be configured to be incorporated in the image capturing apparatus 100 or may be configured to be capable of connecting to the image capturing apparatus 100 as an externally attached, external apparatus (such as an external monitor or a television receiver). When the display unit 105 is an external display apparatus, the image capturing apparatus 100 need only include an interface for outputting a display signal for displaying image information on the display unit 105. In such a case, the control unit 101 controls each component of the image capturing apparatus 100 so as to generate a display signal and output the display signal to the display unit 105 according to a program. The display unit 105 thus displays image information based on the display signal outputted from the image capturing apparatus 100. The control unit 101 can perform a picture-in-picture (hereinafter PinP) display of image information read from the non-volatile memory 102 or the storage medium 108 or image information externally inputted via the input/output OF 107, using the image processing unit 104. PinP is a method in which a screen (sub-screen) smaller in size than the entire screen (main screen) of the display unit 105 is superimposed and displayed on a part of the main screen. The image information displayed on the main screen and the image information displayed on the sub-screen may be the same image information or different image information and can be arbitrarily set by the user. In the present embodiment, at least one of first image information and second image information is displayed on the display unit 105. When the first image information is displayed on the main screen, the second image information is displayed on the sub-screen, and when the second image information is displayed on the main screen, the first image information is displayed on the sub-screen. The first image information includes an image (captured image (live view image)) captured by the image capturing unit 110 and an image (reproduced image) read from the non-volatile memory 102 or the storage medium 108. The second image information is an image externally inputted via the input/output OF 107 and includes an image inputted from the expansion apparatus 200 to be described later and a return image captured by an image capturing apparatus different from the image capturing apparatus 100. The return image is, for example, an image obtained by capturing the same subject by an image capturing apparatus different from the image capturing apparatus 100. The control unit 101 can switch the first image information and the second image information displayed on the main screen and the sub-screen. Note that "image" encompasses still images and moving images. A display size of the second image displayed on the sub-screen can be changed by the image processing unit 104 within a display region of the main screen.

The operation unit 106 is a keyboard, a mouse, a touch panel, a button, a dial, a joystick, a touch sensor, a touch pad, and the like and is an input device for receiving user operations. The operation unit 106 outputs an instruction according to a user operation to the control unit 101, and the control unit 101 executes processing according to the instruction from the operation unit 106. The operation unit 106 also includes a mode selection switch for switching over the operation mode of the image capturing apparatus 100 to either image shooting mode for shooting an image or reproduction mode for reproducing a shot image. The operation mode of the image capturing apparatus 100 may be switched over in a menu screen GUI or the like instead of with the mode selection switch. In addition, the image shooting mode and the reproduction mode can be switched over to PinP mode or non-PinP mode in the menu screen GUI, by a display selection switch included in the operation unit 106, and the like. In the PinP mode, the image information displayed on the main screen can be switched over to the first image information or the second image information, or the image information displayed on the sub-screen can be switched over to the first image information or the second image information.

The operation unit 106 includes a touch panel 106a capable of detecting touch operations on the display unit 105. The touch panel 106a and the display unit 105 may be configured to be integrated. For example, the touch panel 106a is configured such that its light transmittance does not interfere with the display of the display unit 105 and is mounted on an upper layer of a display surface of the display unit 105. Then, input coordinates on the touch panel 106a are associated with display coordinates on the display unit 105. This makes it possible to configure a GUI on which the user can directly manipulate a screen displayed on the display unit 105. The control unit 101 can detect an operation on and a state of the touch panel 106a.

The input/output I/F 107 is an interface connected to the storage medium 108 and an external device connected to a connection unit 109. The input/output I/F 107 includes an interface that can be connected wireles sly or by cable. In case of wireless connections, communication methods, such as a wireless local area network (LAN), infrared communication, Bluetooth®, and Wireless USB, are used, and it is also possible to connect to the Internet. In a case of wired connections, cables, such as Universal Serial Bus (USB) cables, Serial Digital Interface (SDI) and High-Definition Multimedia Interface (HDMI®) cables for connecting external display apparatuses and the like are used. External devices to be connected to the input/output I/F 107 are, for example, another image capturing apparatus and the expansion apparatus 200 to be described later. The storage medium 108 is a storage medium, such as a semiconductor memory and a magnetic disk like a memory card and a hard disk, a compact disc (CD), and a digital versatile disk (DVD). The control unit 101 reads out data from the storage medium 108 and writes data to the storage medium 108 via the input/output I/F 107. The control unit 101 also inputs and output data to and from an external device via the input/output I/F 107.

The input/output I/F 107 can take input of second image information from another image capturing apparatus connected to the connection unit 109. The control unit 101 can temporarily hold the second image information in the volatile memory 103, generate a display signal corresponding to the second image information, and output the display signal to the display unit 105 or an external display apparatus via the input/output I/F 107. The control unit 101 outputs the display signal corresponding to the second image information to the display unit 105 or an external display apparatus when a predetermined operation is performed as a return image display instruction on a predetermined operation member included in the operation unit 106 in the image shooting mode or the reproduction mode. A case where a predetermined operation is performed on a predetermined operation member is, for example, while a long press on a particular button is detected or a case where switching of a toggle switch is detected. When a plurality of display apparatuses including the display unit 105 are connected to the image capturing apparatus 100, it is possible to output the second image information to only a particular display apparatus or to all of the display apparatuses.

The connection unit 109 connects an external device with the input/output I/F 107. The connection unit 109 includes an antenna for receiving a radio signal in a case of a wireless connection and includes an SDI or HDMI® connector and the like for connecting a cable in a case of a wired connection.

The image capturing unit 110 includes an optical system including a lens, a shutter, a diaphragm and the like; an image sensor configured by a CCD or CMOS sensor or the like for converting an optical image into an electrical signal; and an A/D converter for converting an analog signal generated by the image sensor into a digital signal. The image capturing unit 110 can capture still images and moving images.

Configuration of Expansion Apparatus 200

Next, a configuration and functions of the expansion apparatus 200 according to the present embodiment will be described with reference to FIG. 2 and FIGS. 3A and 3B.

Figure 2:
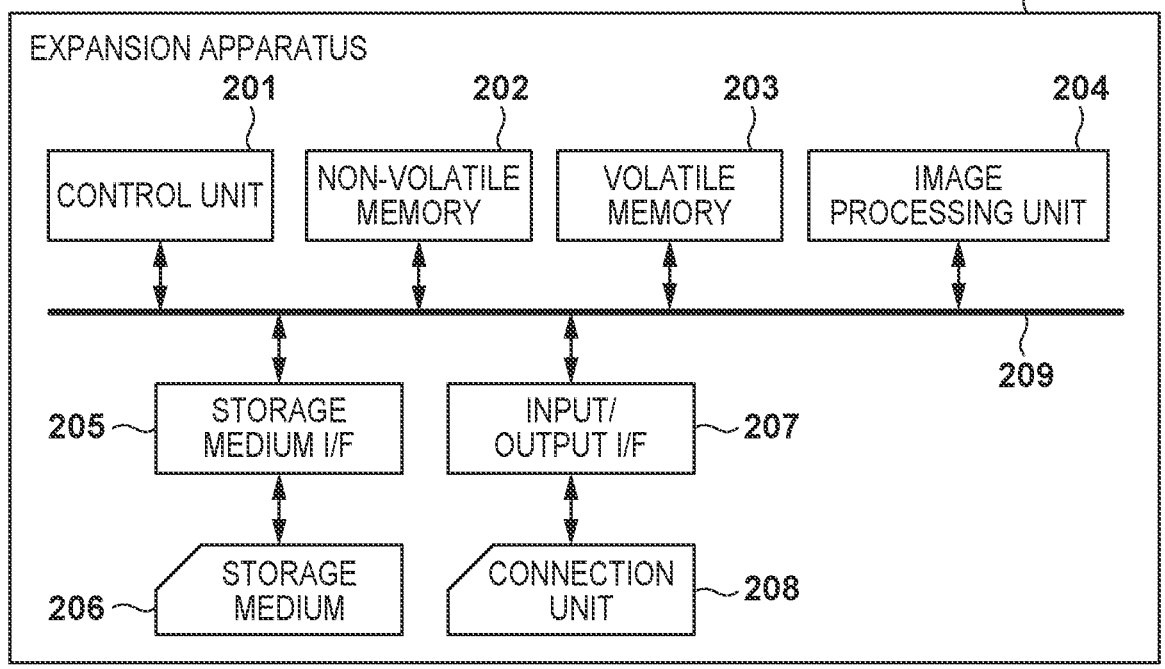
FIG. 2 is a block diagram illustrating a configuration of an expansion apparatus according to the present embodiment.
Figure 3A:
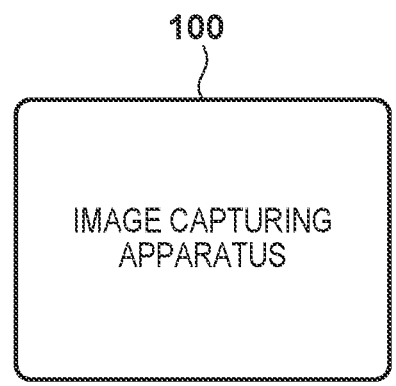
FIGS. 3A and 3B are diagrams illustrating examples of a connection between the image capturing apparatus and the expansion apparatus according to the present embodiment.
Figure 3B:
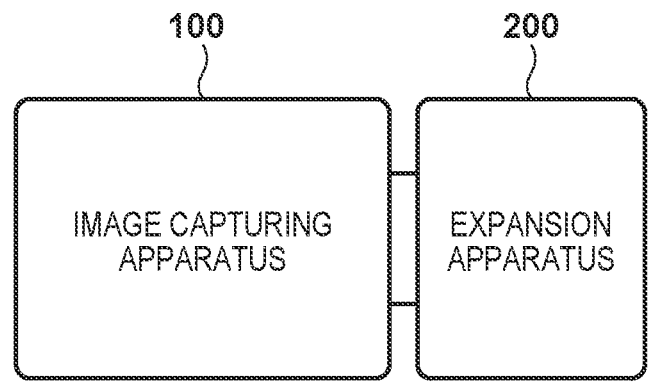

FIG. 2 is a block diagram illustrating a configuration of the expansion apparatus 200 according to the present embodiment. FIGS. 3A and 3B are diagrams illustrating examples of a connection between the image capturing apparatus 100 and the expansion apparatus 200. FIG. 3A illustrates a state in which the expansion apparatus 200 is not connected to the image capturing apparatus 100. FIG. 3B illustrates a state in which the expansion apparatus 200 is connected to the image capturing apparatus 100. When a connection unit 208 of the expansion apparatus 200 is connected to the connection unit 109 of the image capturing apparatus 100, an input/output I/F 207 of the expansion apparatus 200 and the input/output I/F 107 of the image capturing apparatus 100 become connected so as to be capable of inputting and outputting data, and thereby, it becomes possible for the image capturing apparatus 100 to control the expansion apparatus 200.

The expansion apparatus 200 is connected in order to expand the configuration and functions of the image capturing apparatus 100. The expansion of the image capturing apparatus 100 includes addition to the configuration and functions provided in the image capturing apparatus 100 and enhancement of performance of the configuration and functions provided in the image capturing apparatus 100.

The expansion apparatus 200 includes a control unit 201, a non-volatile memory 202, a volatile memory 203, an image processing unit 204, a storage medium I/F 205, the input/output OF 207, and the connection unit 208. The components of the expansion apparatus 200 are each connected by an internal bus 209 so as to be capable of transmitting and receiving data to each other.

The control unit 201, the non-volatile memory 202, the volatile memory 203, the image processing unit 204, a storage medium 206, and the connection unit 208 of the expansion apparatus 200 have roughly similar configuration and functions as the control unit 101, the non-volatile memory 102, the volatile memory 103, the image processing unit 104, the storage medium 108, and the connection unit 109 of the image capturing apparatus 100 illustrated in FIG.

1. In the following, differences from the image capturing apparatus 100 will mainly be described.

The storage medium I/F 205 is an interface with the storage medium 206, such as a semiconductor memory and a magnetic disk like a memory card and a hard disk, a compact disc (CD), and a digital versatile disk (DVD). The control unit 201 reads out data from the storage medium 206 and writes data to the storage medium 206 via the storage medium I/F 205.

The input/output I/F 207 is an interface for connecting to an external device and has a similar configuration and function as the input/output I/F 107 of the image capturing apparatus 100 illustrated in FIG. 1. The input/output I/F 207 includes a first input/output I/F and a second input/output I/F. The first input/output I/F can be connected to the image capturing apparatus 100 or another expansion apparatus and inputs and outputs data to and from the image capturing apparatus 100 or the other expansion apparatus. The second input/output I/F can be connected to another expansion apparatus and inputs and outputs data to and from the other expansion apparatus.

Screen Displays of Image Capturing Apparatus 100

Next, screens to be displayed on the display unit 105 of the image capturing apparatus 100 according to the present embodiment will be described with reference to FIG. 4A to FIG. 6B.

Figure 4A:
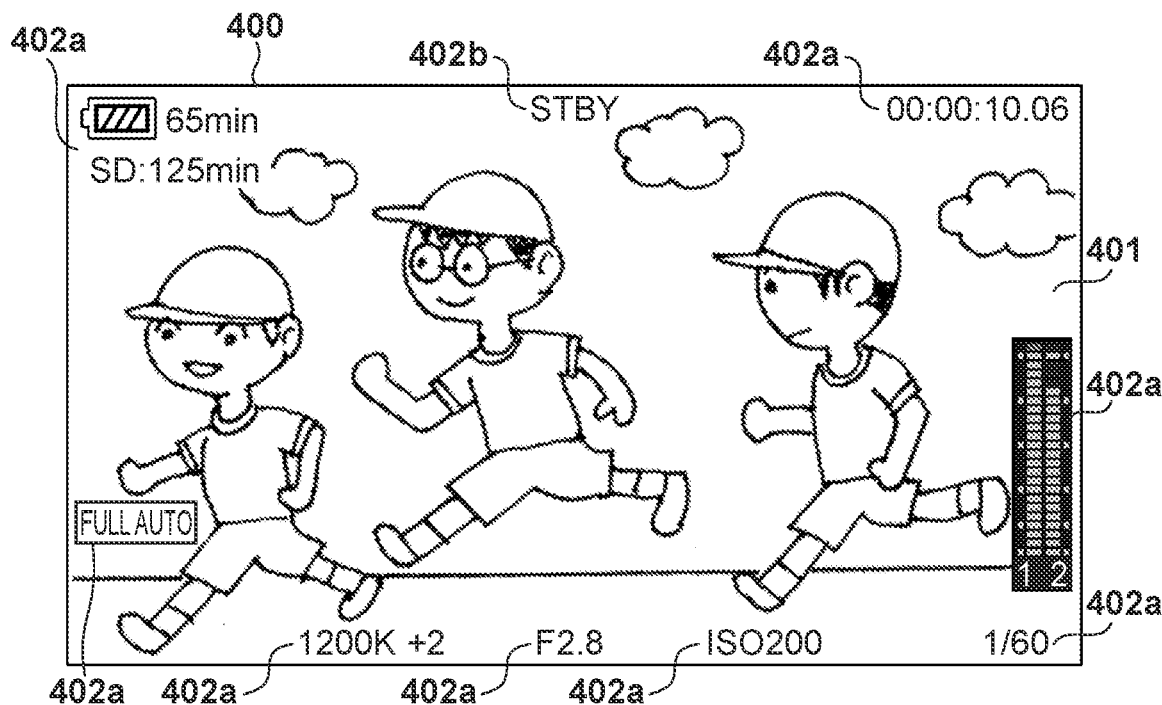
FIGS. 4A to 4C are diagrams illustrating examples of screen displays in non-PinP mode according to the present embodiment.
Figure 4B:
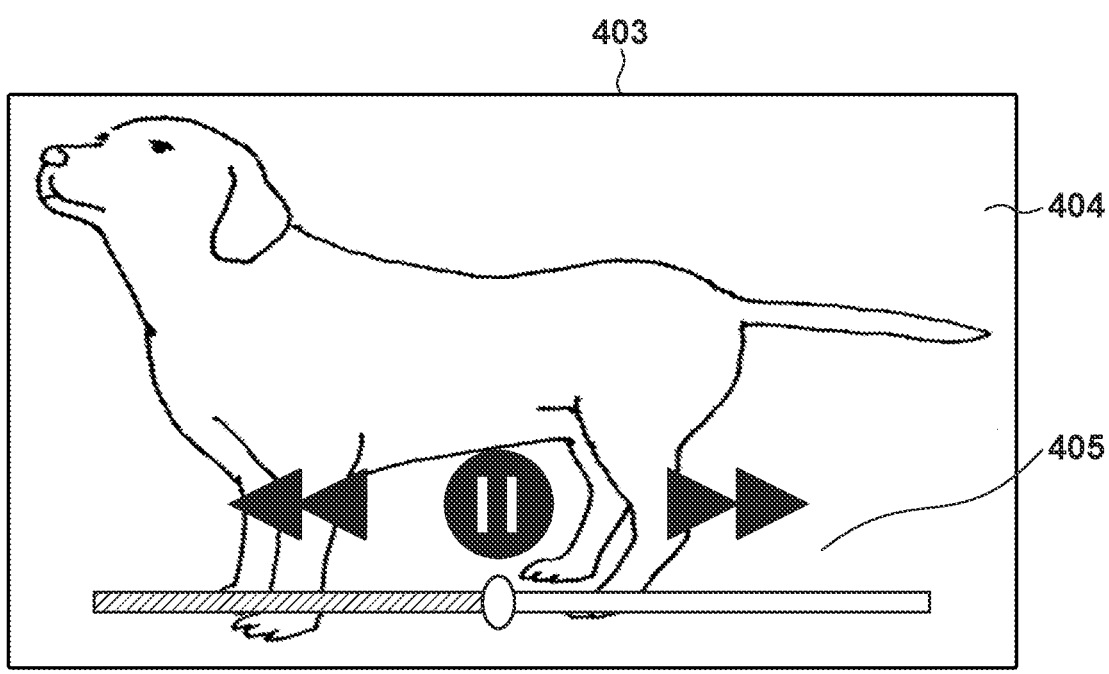
Figure 4C:
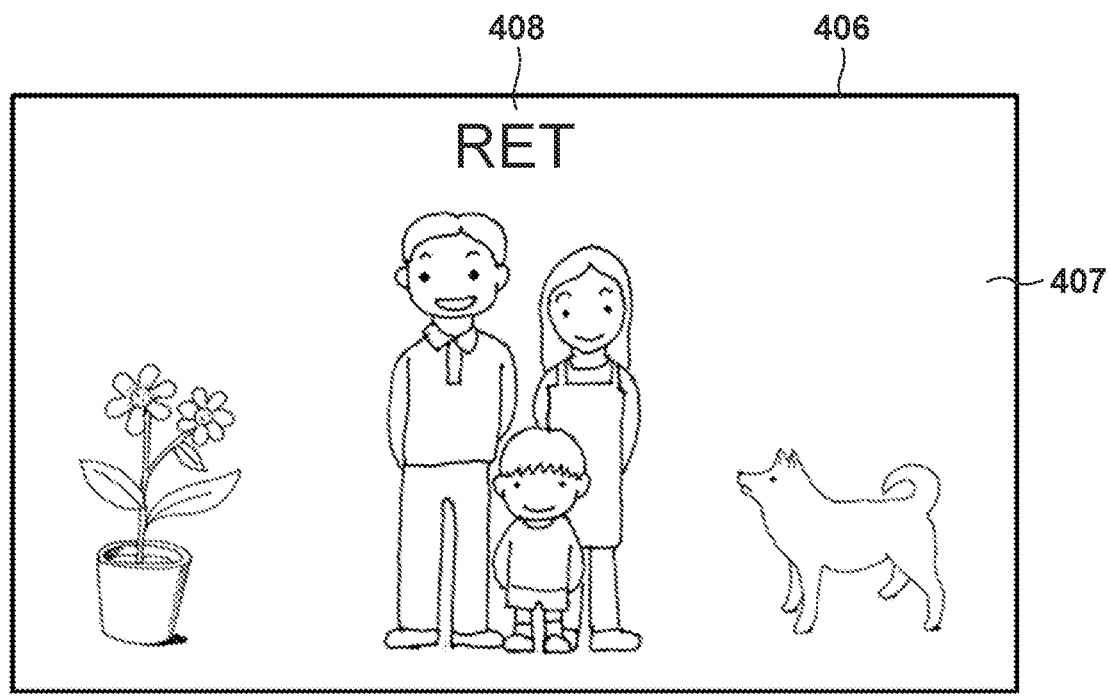

FIGS. 4A to 4C are diagrams illustrating examples of screen displays in the non-PinP mode of the image capturing apparatus 100 according to the present embodiment.

A screen 400 of FIG. 4A is a state in which OSDs 402a, such as image shooting parameters for when a captured image 401 is captured, a remaining amount of battery, and an image shooting time, and an OSD 402b indicating that the image capturing apparatus 100 is in an image shooting standby state are being superimposed and displayed on a live view image (captured image) 401 captured by the image capturing unit 110. The OSDs 402a and 402b of the captured image 401 are generated by the image processing unit 104 and superimposed on the captured image 401.

A screen 403 of FIG. 4B is a state in which an image 404 read from the storage medium 108 via the input/output I/F 107 or inputted from the storage medium 206 of the expansion apparatus 200 is being displayed. On the screen 403, a GUI 405 for starting/stopping reproduction, fast-forwarding, fast-rewinding, and specifying a reproduction position is being superimposed and displayed on the image 404. The GUI 405 of the image 404 is generated by the image processing unit 104 and superimposed on the image 404.

A screen 406 of FIG. 4C is a state in which a return image 407, which is the second image information inputted from an external device via the input/output I/F 107, is being displayed. In the screen 406, an OSD 408 indicates that the return image 407 is being superimposed and displayed on the return image 407. The OSD 408 is generated by the image processing unit 104 and superimposed on the image 407.

Figure 5A:
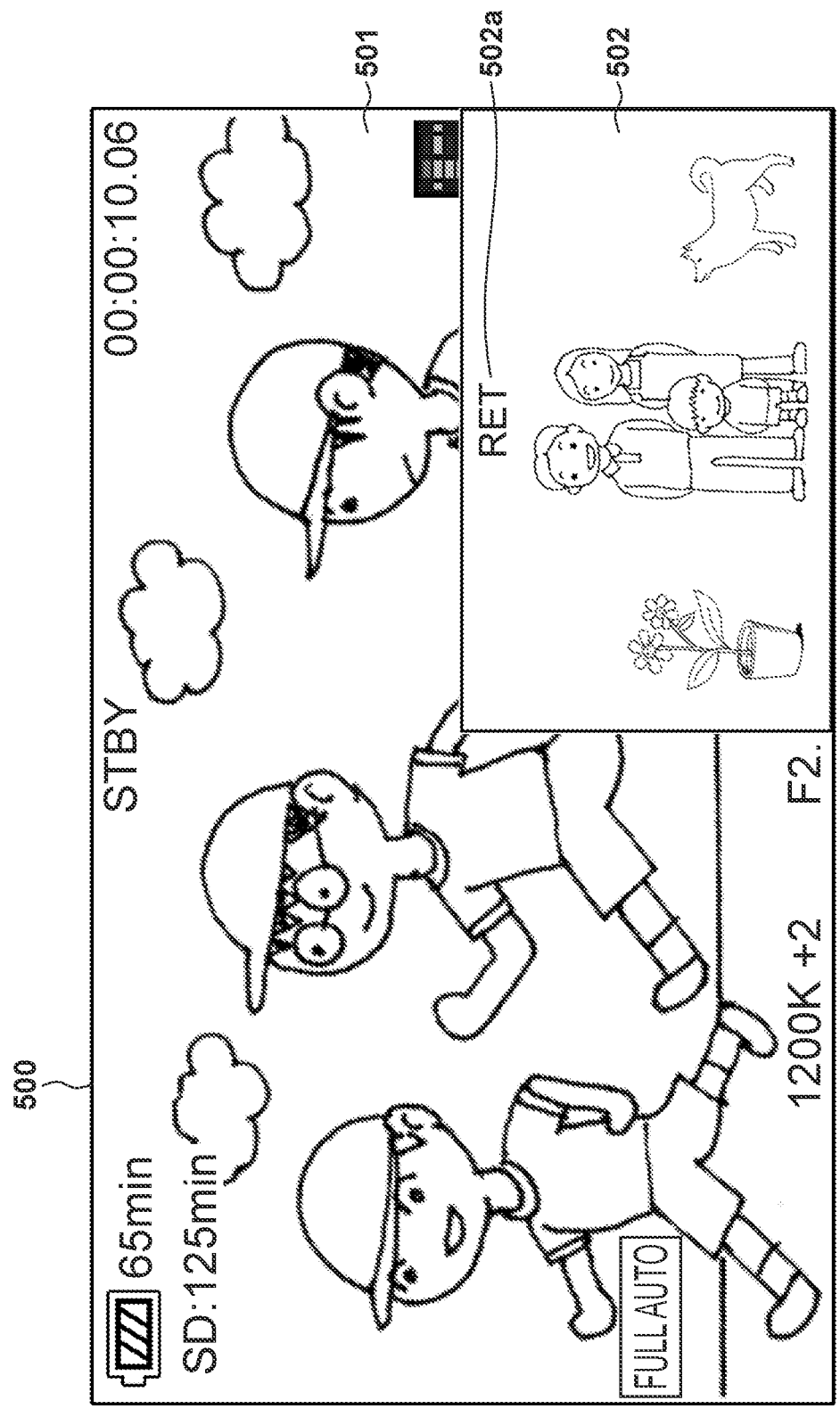
FIGS. 5A and 5B are diagrams illustrating examples of screen displays in a PinP mode according to the present embodiment.
Figure 5B:
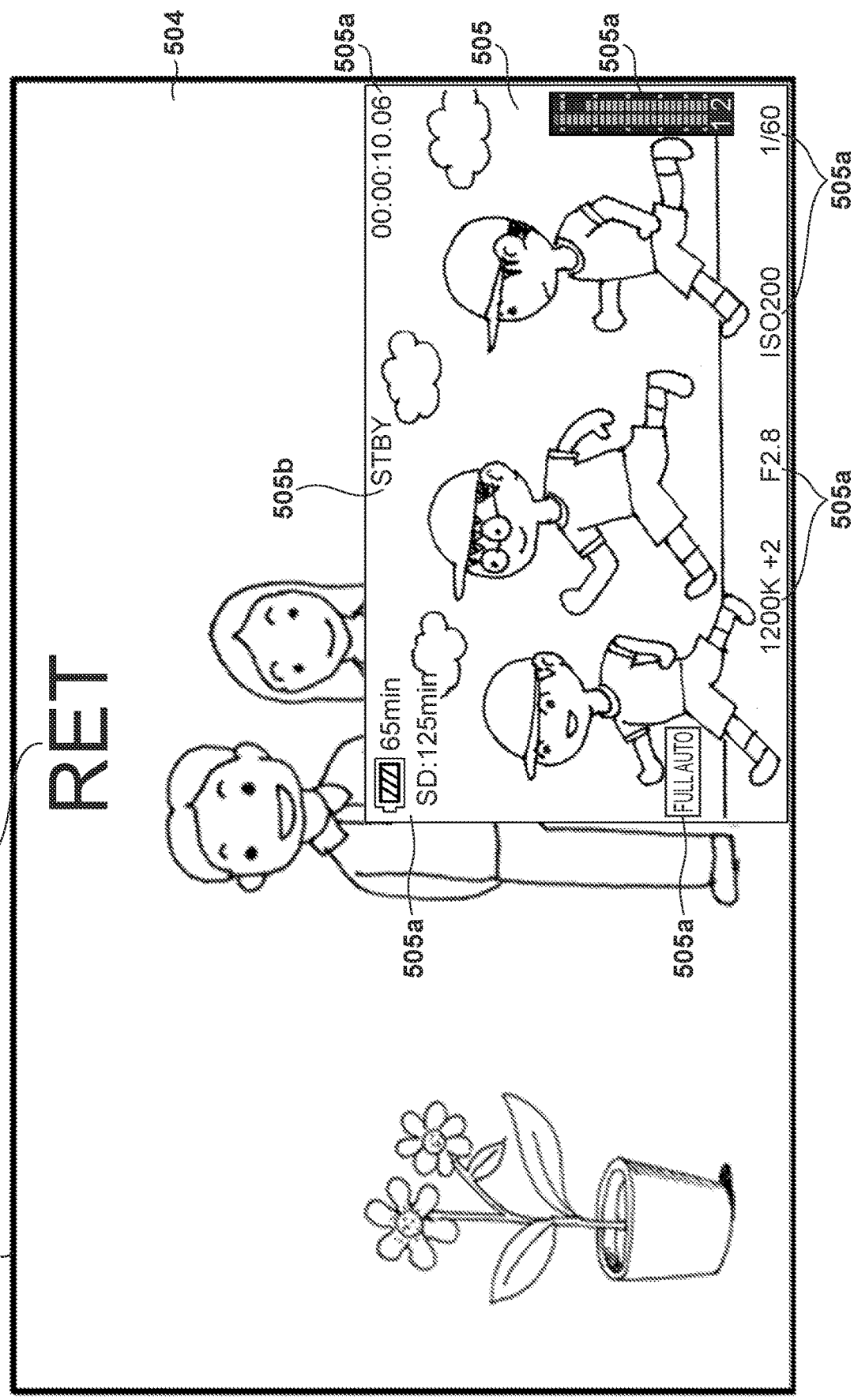

FIGS. 5A and 5B are diagrams illustrating examples of screen displays in the PinP mode of the image capturing apparatus 100 according to the present embodiment.

A screen 500 of FIG. 5A is a state in which a return image 502 is being superimposed and displayed as a sub-screen on a captured image 501 being displayed on a main screen of the display unit 105. The return image 502 is being displayed as a sub-screen in a lower right region, which is a part of the main screen 500, at a display size smaller than that of the captured image 501 being displayed on the main screen 500. The display size of the return image 502 of the sub-screen is resized by the image processing unit 104. An OSD 502a indicates that a return image is being superimposed and displayed on the return image 502 on the return image 502. The OSD 502a is generated by the image processing unit 104 and superimposed on the return image 502.

A screen 503 of FIG. 5B is a state in which a captured image 505 is being superimposed and displayed as a sub-screen on a return image 504 being displayed on the main screen of the display unit 105. The captured image 505 is being displayed as a sub-screen in a lower right region, which is a part of the main screen 503, at a display size smaller than that of the return image 504 being displayed on the main screen 503. The display size of the captured image 505 of the sub-screen is resized by the image processing unit 104. An OSD 504a indicates that a return image is being superimposed and displayed on the return image 504. The OSD 504a is generated by the image processing unit 104 and superimposed on the return image 504. OSDs 505a and 505b of the captured image 505 are generated by the image processing unit 104 and superimposed on the captured image 505.

Figure 6A:
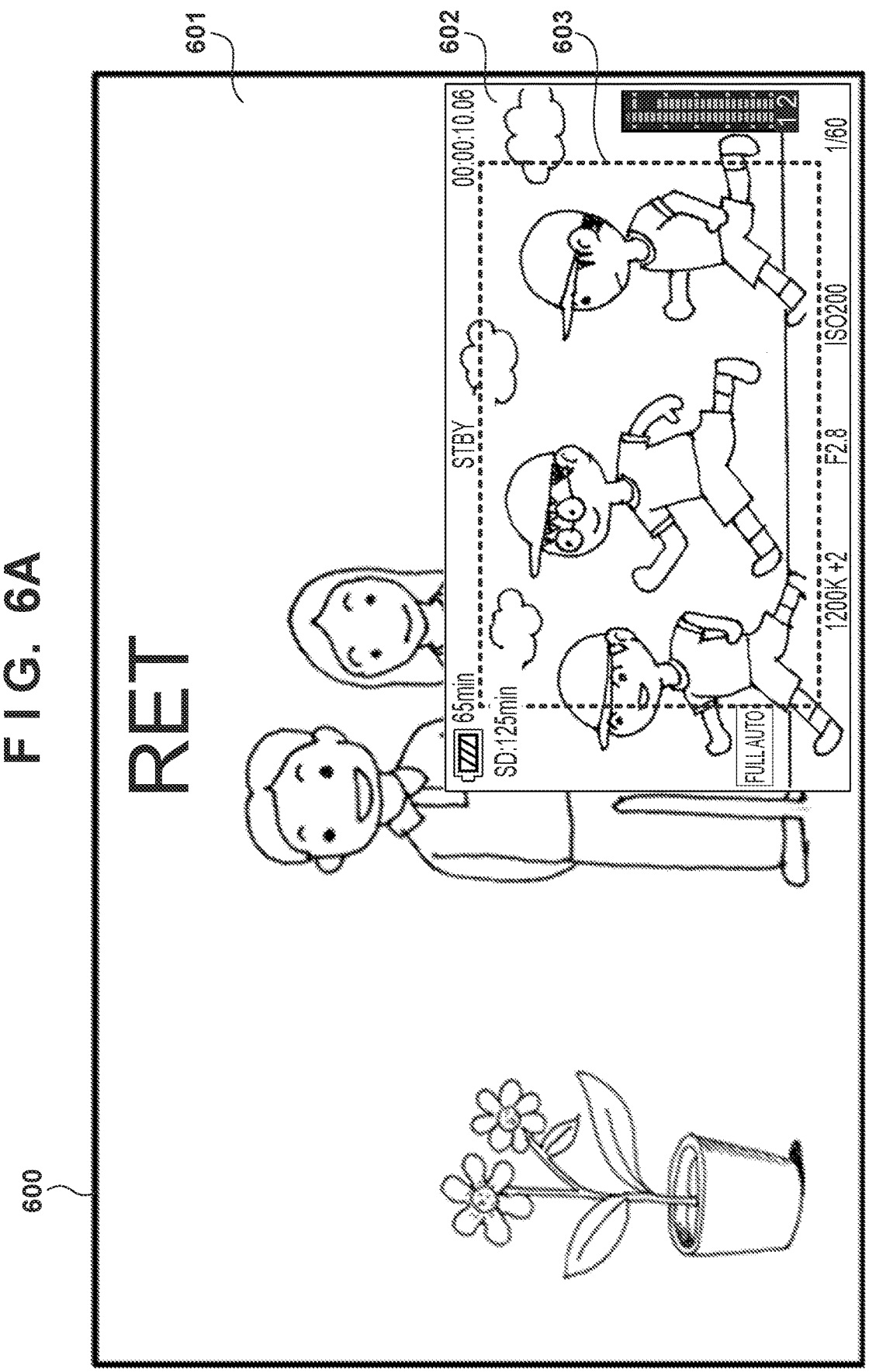
FIGS. 6A and 6B are diagrams illustrating a display size of a sub-screen in the PinP mode according to the present embodiment.
Figure 6B:
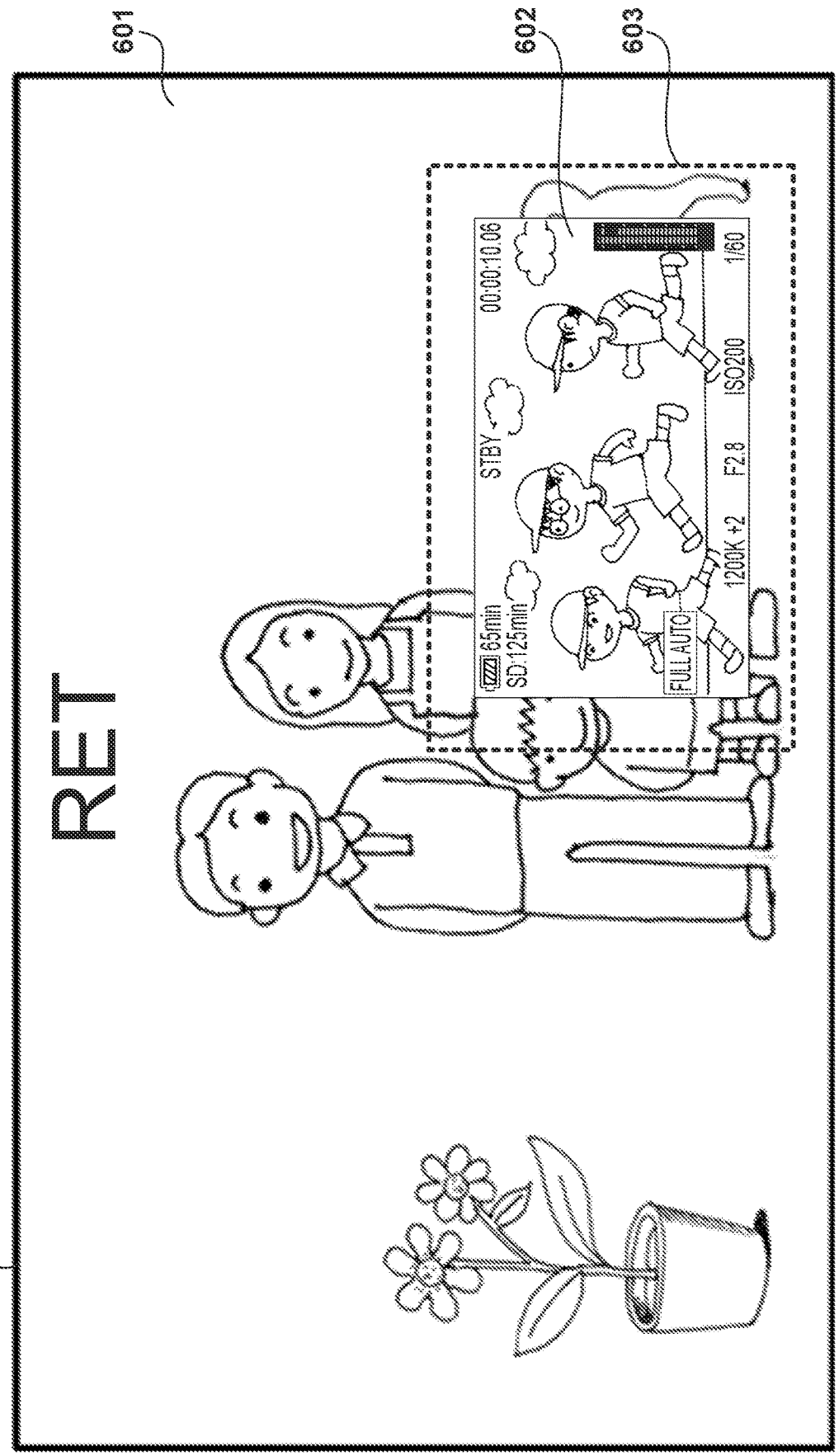

FIGS. 6A and 6B exemplify states in which a captured image 602 is being displayed as a sub-screen at a display size smaller than that of a return image 601 being displayed on a main screen and being superimposed on the return image 601 in the PinP mode of the image capturing apparatus 100 according to the present embodiment.

A screen 600 of FIG. 6A is a state in which the captured image 602 being displayed as a sub-screen is being superimposed and displayed on the return image 601, at a display size greater than or equal to a region of a threshold 603.

A screen 604 of FIG. 6B is a state in which the captured image 602 being displayed as a sub-screen is being superimposed and displayed on the return image 601, at a display size less than the region of the threshold 603.

In the present embodiment, control processing in which user operations performed with respect to a currently displayed image are disabled is performed in a state in which a return image is being displayed on a main screen. Furthermore, in the present embodiment, control processing in which user operations performed with respect to a currently displayed image are disabled when a display size of a captured image is less than a threshold or when a position of an operation is inside a display region of a return image is performed in a state in which the captured image is being displayed as a sub-screen at a display size smaller than that of the return image and being superimposed on the return image being displayed on a main screen. In such cases, the user operations performed with respect to a currently displayed image includes touch operations with respect to the currently displayed image and non-touch operations performed using an operation unit (such as a button) other than the touch panel of the display unit 105. A user operation performed with respect to a currently displayed image is, for example, an operation for specifying in a currently displayed live view image a position on which a focus is adjusted by AF processing, such as an operation for moving an AF frame to a desired subject on a display screen.

The threshold 603 illustrated in FIGS. 6A and 6B is visualized in order to facilitate understanding and is not displayed on an actual screen.

First Control Processing

Next, first control processing by the image capturing apparatus 100 according to the present embodiment will be described with reference to FIG. 7 and FIGS. 8A and 8B.

The first control processing is control processing in which a user operation performed with respect to the currently displayed image is enabled or disabled depending on the display state of the currently displayed image when a touch operation is detected as the user operation. This makes it possible to notify the user that processing corresponding to the touch operation performed with respect to the currently displayed image will not be performed.

Figure 7:
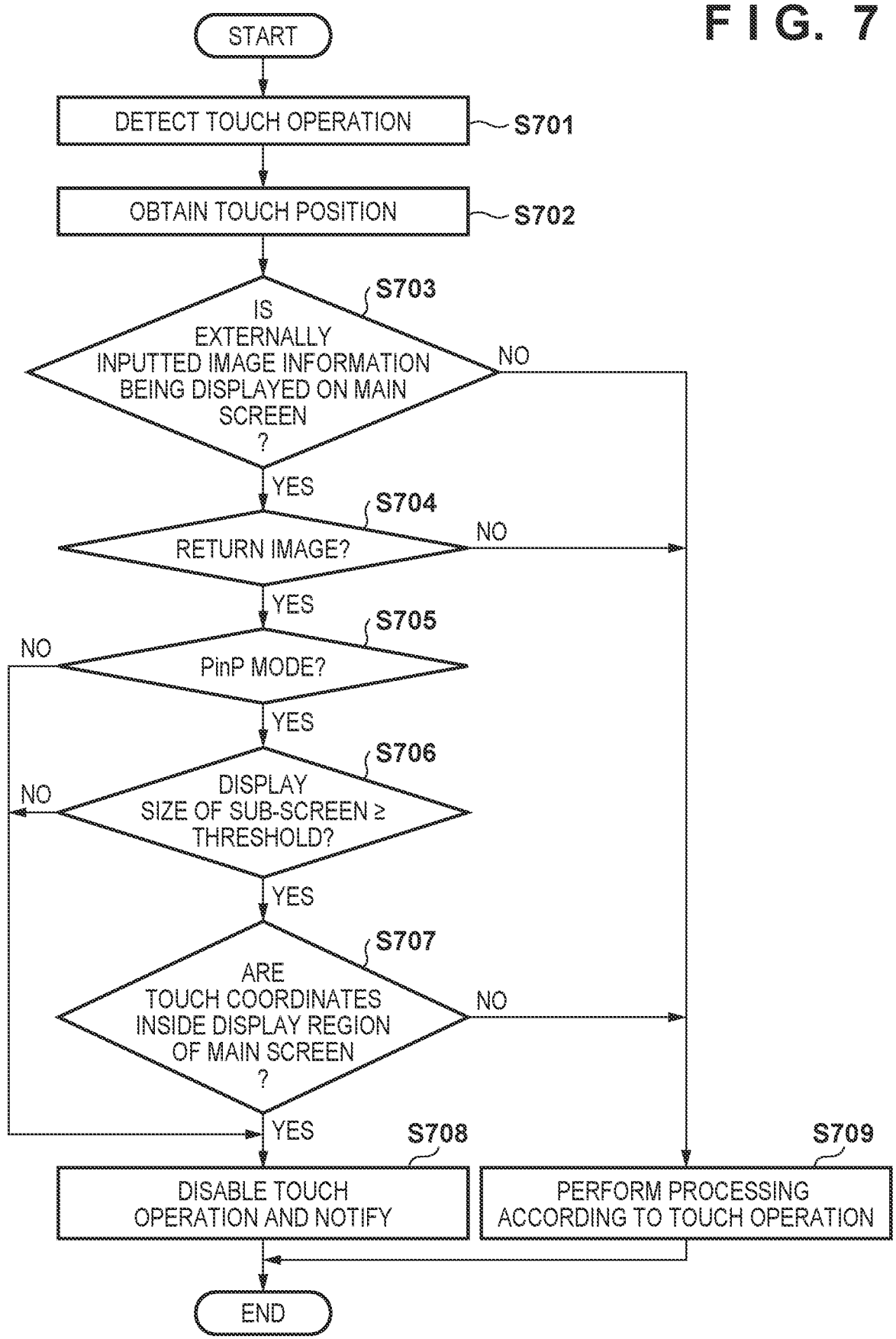
FIG. 7 is a flowchart illustrating first control processing according to the present embodiment.

FIG. 7 is a flowchart illustrating the first control processing according to a touch operation of the image capturing apparatus 100 according to the present embodiment.

The processing of FIG. 7 is realized by the control unit 101 controlling each component of the image capturing apparatus 100 and/or the expansion apparatus 200 by executing a program stored in the non-volatile memory 102. Further, the processing of FIG. 7 is started in a state in which another image capturing apparatus or another external device is connected to the image capturing apparatus 100 or the expansion apparatus 200 connected to the image capturing apparatus 100, and the second image information (return image) can be received from the other image capturing apparatus or the other external device. Further, the processing of FIG. 7 is started in a state in which the operation mode of the image capturing apparatus 100 is in the image shooting mode or the reproduction mode, and image information is being displayed on the display unit 105. It is similar for FIGS. 9 and 11 to be described later.

In step S701, the control unit 101 detects a touch operation on a display screen of the display unit 105, using the touch panel 106a.

In step S702, the control unit 101 obtains coordinate information of a touch position for the touch operation detected in step S701 and stores the coordinate information in the volatile memory 103.

In step S703, the control unit 101 determines whether the image information being displayed on the main screen of the display unit 105 is the externally inputted second image information. The control unit 101 determines that the image information being displayed on the main screen of the display unit 105 is the second image information when the image information is image information inputted via the input/output I/F 107 or the input/output I/F 207 of the expansion apparatus 200. The control unit 101 advances the processing to step S704 when the control unit 101 determines that the image information being displayed on the main screen of the display unit 105 is the externally inputted second image information. The control unit 101 advances the processing to step S709 when the control unit 101 determines that the image information being displayed on the main screen of the display unit 105 is not the externally inputted second image information.

In step S704, the control unit 101 determines whether the second image information being displayed on the main screen of the display unit 105 is a return image. The control unit 101 determines that the second image information being displayed on the main screen of the display unit 105 is a return image when a predetermined operation (return image display instruction) on a predetermined operation member included in the operation unit 106 is received. The control unit 101 advances the processing to step S705 when the control unit 101 determines that the second image information being displayed on the main screen of the display unit 105 is a return image and advances the processing to step S709 when the control unit 101 determines that the second image information is not a return image.

In step S705, the control unit 101 determines whether image information being displayed on the main screen of the display unit 105 is being displayed in the PinP mode. The control unit 101 determines whether the operation mode of the image capturing apparatus 100 is set to the PinP mode based on settings for the display selection switch included in the operation unit 106, menu screen GUI settings, and the like. The control unit 101 advances the processing to step S706 when the control unit 101 determines that the image information being displayed on the main screen of the display unit 105 is being displayed in the PinP mode. The control unit 101 advances the processing to step S708 when the control unit 101 determines that the image information being displayed on the main screen of the display unit 105 is not displayed in the PinP mode.

In step S706, the control unit 101 determines whether a display size of the first image information (captured image or reproduced image) generated by the image processing unit 104 and being displayed as the sub-screen on the display unit 105 is greater than or equal to a threshold. The control unit 101 advances the processing to step S707 when the control unit 101 determines that display size of the first image information being displayed as a sub-screen on the display unit 105 is greater than or equal to the threshold. The control unit 101 advances the processing to step S708 when the control unit 101 determines that display size of the image being displayed as a sub-screen on the display unit 105 is less than the threshold.

In step S707, the control unit 101 determines whether the touch position obtained in step S702 is inside a display region of the return image being displayed on the main screen of the display unit 105. The control unit 101 advances the processing to step S708 when the control unit 101 determines that the touch position obtained in step S702 is inside the display region of the return image being displayed on the main screen of the display unit 105. The control unit 101 advances the processing to step S709 when the control unit 101 determines that the touch position obtained in step S702 is not inside the display region of the return image being displayed on the main screen of the display unit 105.

Figure 8A:
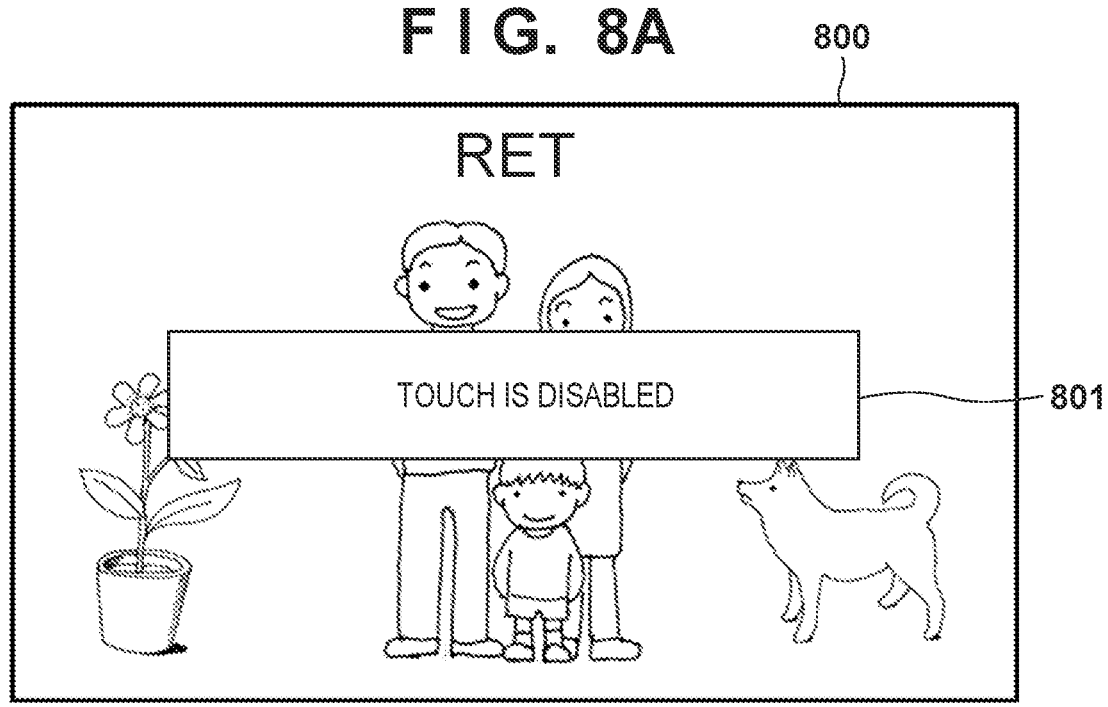
FIGS. 8A and 8B are diagrams illustrating examples of screen displays for when a touch operation is disabled in step S708 of FIG. 7.
Figure 8B:
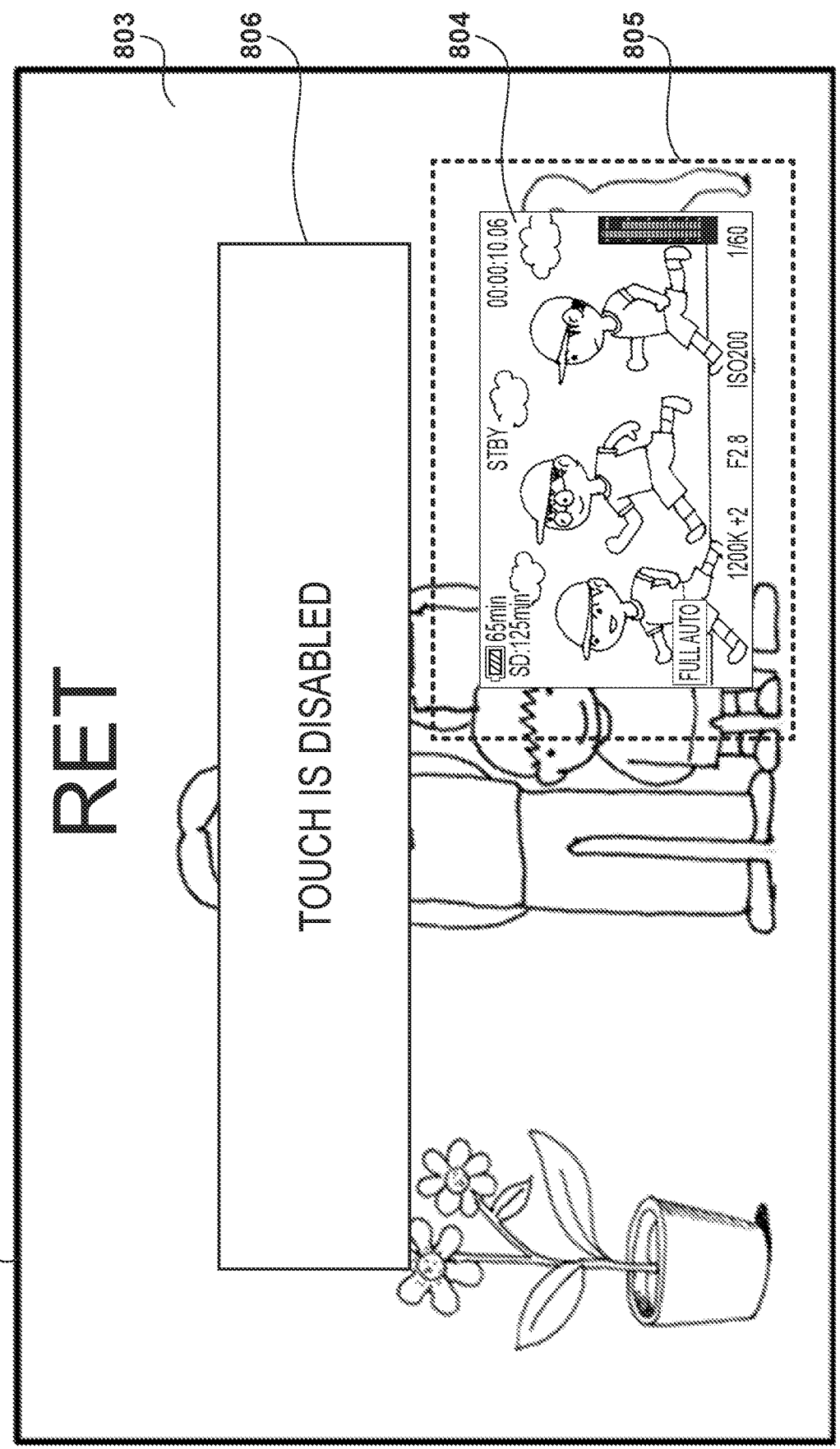

In step S708, the control unit 101 disables the touch operation detected in step S701, displays a message notifying the user that the touch operation has been disabled as illustrated in FIG. 8A or 8B, and ends the processing. When a return image is displayed on the display unit 105, triggered by an input operation other than a touch operation (such as an operation on a button) being detected, the processing may be terminated without the processing of step S708 being performed.

In step S709, the control unit 101 enables the touch operation detected in step S701, performs processing according to the user operation detected in step S701, and ends the processing.

In steps S707, S708 and S709, the control unit 101 disables the touch operation when the touch position is inside the display region of the return image but enables the touch operation when the touch position is not inside the display region of the return image.

FIGS. 8A and 8B are diagrams illustrating examples of screen displays for when a touch operation is disabled in step S708 of FIG. 7.

A screen 800 of FIG. 8A exemplifies a state in which a message 801 is being displayed to notify the user that a touch operation on a display screen has been disabled when the touch operation has been detected in the non-PinP mode. The screen 800 indicates a display example for a state (YES in step S704 and NO in step S705 of FIG. 7) in which a return image is being displayed on the main screen of the display unit 105. By viewing the message 801, the user can recognize that processing according to the touch operation has not been performed.

A screen 802 of FIG. 8B exemplifies a state in which a message 806 is being displayed to notify the user that a touch operation on a display screen has been disabled when the touch operation has been detected in the PinP mode. The screen 802 indicates an example of a display in a state (YES in step S705 and NO in step S706 of FIG. 7) in which a captured image 804 is superimposed and displayed as a sub-screen on a return image 803 being displayed on the main screen of the display unit 105 and a display size of the captured image 804 is less than a threshold 805. By viewing the message 806, the user can recognize that processing according to the touch operation has not been performed.

The threshold 805 illustrated in FIG. 8B is visualized in order to facilitate understanding and is not displayed on an actual screen.

Second Control Processing

Next, second control processing by the image capturing apparatus 100 according to the present embodiment will be described with reference to FIG. 9 and FIGS. 10A to 10E.

The first control processing is premised upon a touch operation on the display screen being detected. In contrast, the second control processing is control processing in which it is determined whether to disable touch operations regardless of whether a touch operation on the display screen has been detected and it is notified in advance whether processing according to a touch operation will be performed. This makes it possible to notify the user in advance whether processing according to a touch operation will be performed.

Figure 9:
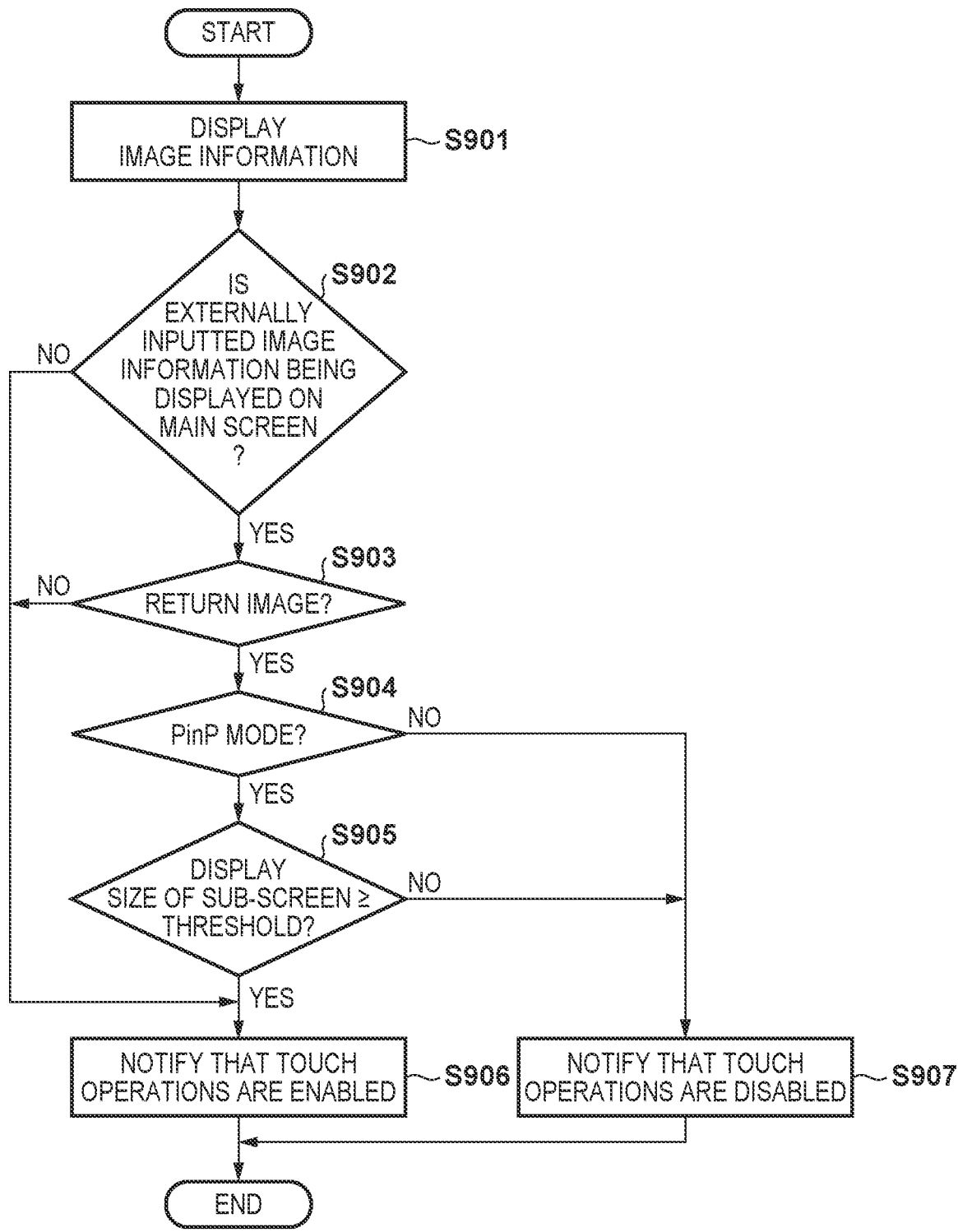
FIG. 9 is a flowchart illustrating second control processing according to the present embodiment.

FIG. 9 is a flowchart illustrating the second control processing by the image capturing apparatus 100 according to the present embodiment.

The processing of step S902 to step S905 of FIG. 9 is similar to the processing of step S703 to step S706 of FIG. 7.

In step S901, the control unit 101 displays image information on the display unit 105 and advances the processing to step S902.

Figure 10A:
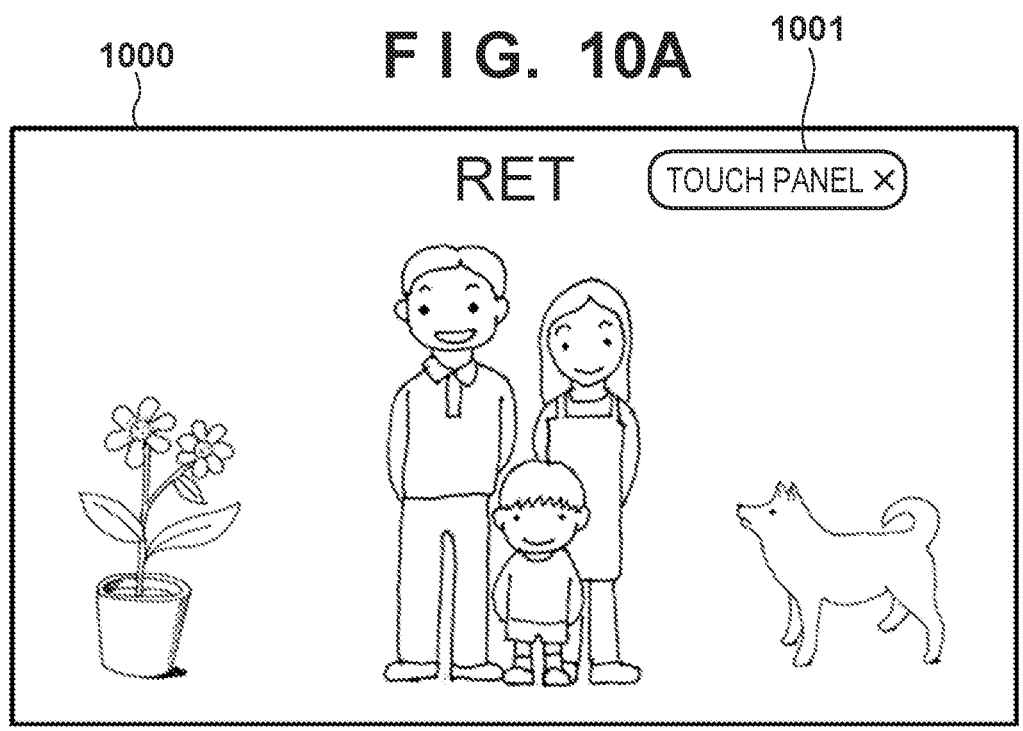
Figure 10B:
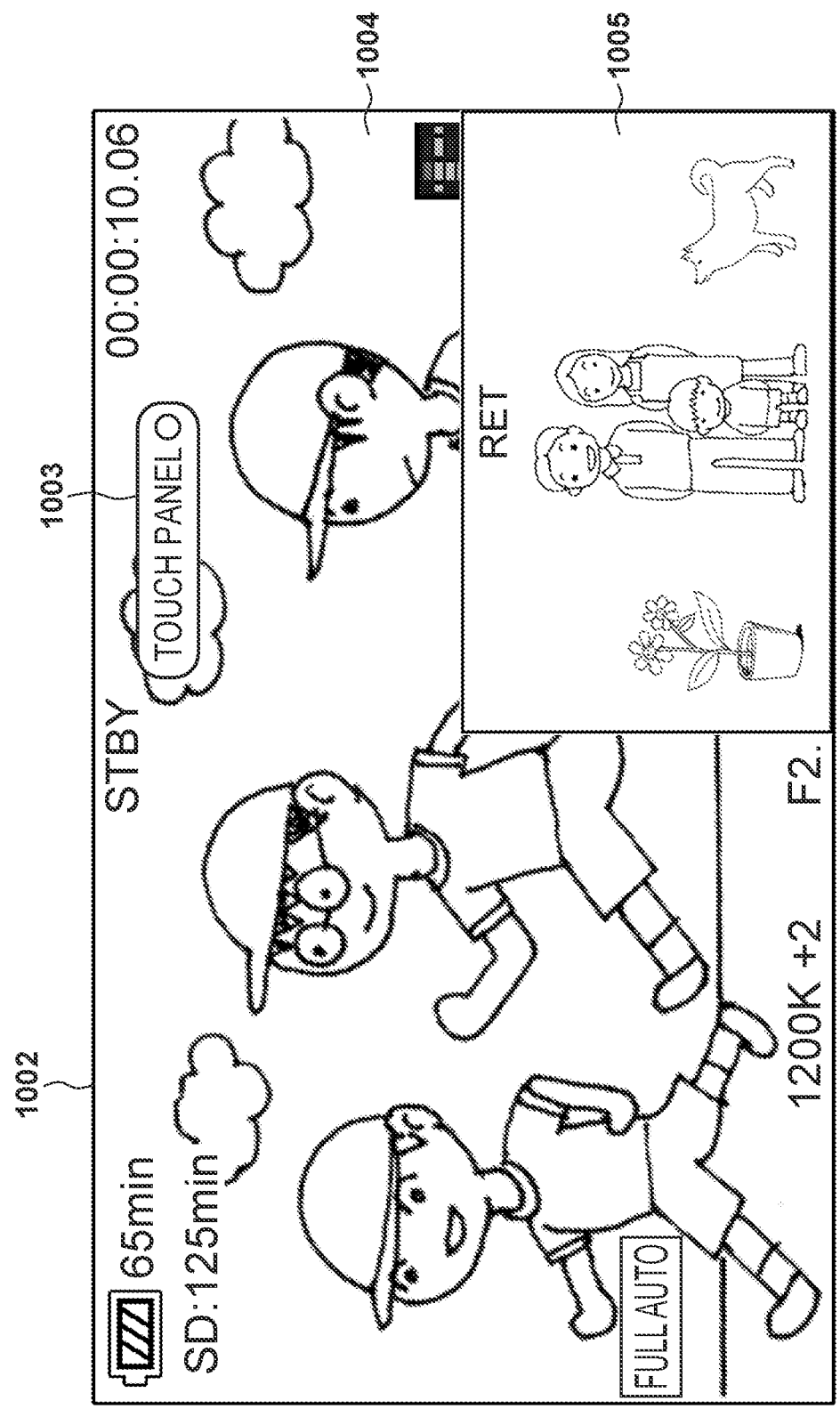
Figure 10C:
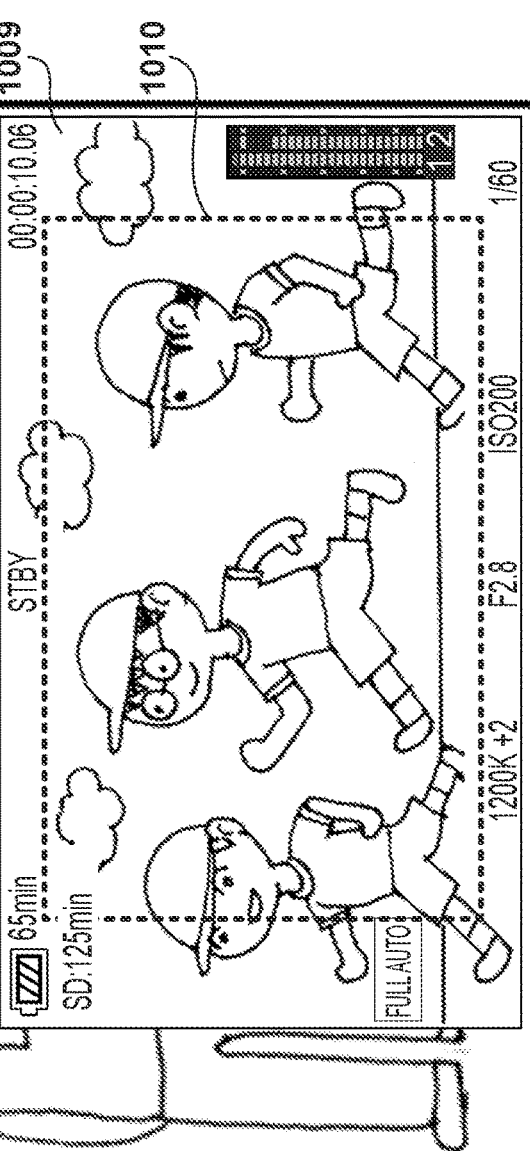

In step S906, the control unit 101 displays an icon notifying the user that touch operations on the display screen are enabled as illustrated in FIGS. 10B, 10C, and 10E and ends the processing.

Figure 10D:
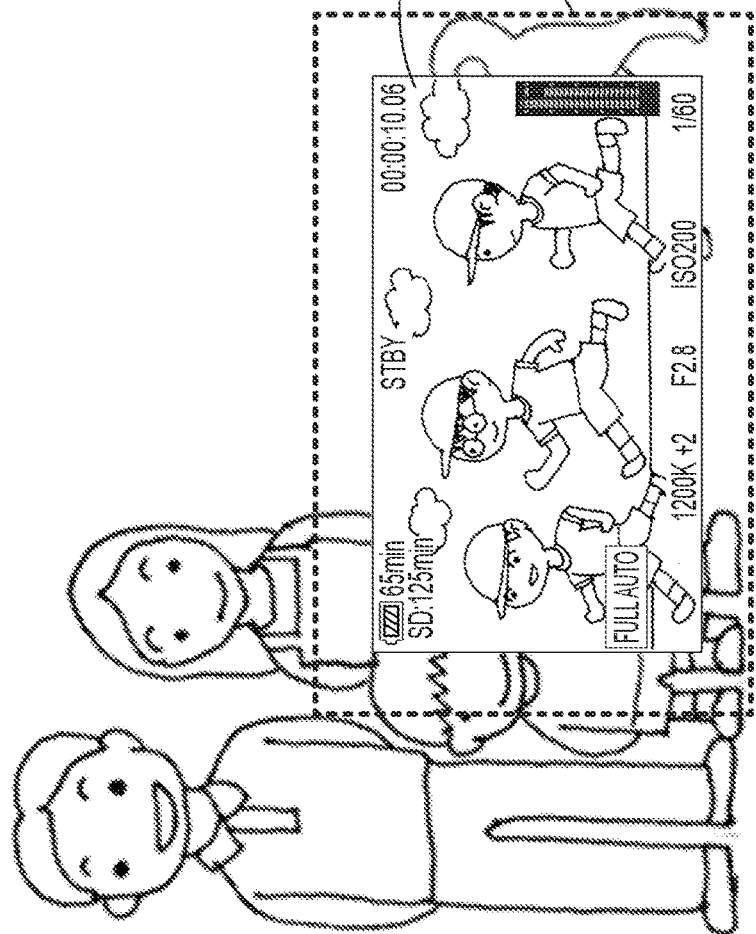

In step S907, the control unit 101 displays an icon notifying the user that touch operations on the display screen are disabled as illustrated in FIGS. 10A and 10D and ends the processing.

FIGS. 10A to 10E illustrate examples of screen displays for when touch operations are enabled in step S906 of FIG. 9 or for when touch operations are disabled in step S907 of FIG. 9.

A screen 1000 of FIG. 10A exemplifies a state in which an icon 1001 for notifying the user that touch operations with respect the display screen are disabled is being displayed in the non-PinP mode. The screen 1000 indicates an example of a display of a state (YES in step S903 and NO in step S904 of FIG. 9) in which a return image is being displayed on the main screen of the display unit 105. By viewing the icon 1001, the user can recognize that even when a touch operation is performed on the display screen, processing according to the touch operation will not be performed.

A screen 1002 of FIG. 10B exemplifies a state in which an icon 1003 for notifying the user that touch operations with respect the display screen are enabled is being displayed in the PinP mode. The screen 1002 indicates an example of a display of a state (NO in step S903 and NO in step S904 of FIG. 9) in which a return image 1005 is being superimposed and displayed as a sub-screen on a captured image 1004 being displayed on the main screen of the display unit 105. By viewing the icon 1003, the user can recognize that processing according to a touch operation on the display screen will be performed.

A screen 1006 of FIG. 10C exemplifies a state in which an icon 1007 for notifying the user that touch operations with respect the display screen are enabled is being displayed in the PinP mode. The screen 1006 indicates an example of a display in a state (YES in step S905 of FIG. 9) in which a captured image 1009 is superimposed and displayed as a sub-screen on a return image 1008 being displayed on the main screen of the display unit 105 and a display size of the captured image 1009 is greater than or equal to a region of a threshold 1010. By viewing the icon 1007, the user can recognize that processing according to the touch operation will be performed.

A screen 1011 of FIG. 10D exemplifies a state in which an icon 1012 for notifying the user that touch operations with respect the display screen are disabled is being displayed in the PinP mode. The screen 1011 indicates an example of a display in a state (NO in step S905 of FIG. 9) in which a captured image 1014 is superimposed and displayed as a sub-screen on a return image 1013 being displayed on the main screen of the display unit 105 and a display size of the captured image 1014 is less than a region of a threshold 1015. By viewing the icon 1012, the user can recognize that processing according to the touch operation will not be performed.

A screen 1016 of FIG. 10E exemplifies a state in which an icon 1017 for notifying the user that touch operations with respect the display screen are enabled is being displayed in the PinP mode. The screen 1016 indicates an example of a display of a state (NO in step S902 and NO in step S903 of FIG. 9) in which a return image 1019 is being superimposed and displayed as a sub-screen on a reproduced image 1018 being displayed on the main screen of the display unit 105. By viewing the icon 1017, the user can recognize that processing according to a touch operation on the display screen will be performed.

In the examples of FIGS. 10A to 10E, although notification to the user is performed by an icon being displayed on the display screen, a notification method other than an icon may be used, such as notification with a message.

The thresholds 1010 and 1015 illustrated in FIGS. 10C and 10D are visualized in order to facilitate understanding and are not displayed on actual screens.

Third Control Processing

Next, third control processing by the image capturing apparatus 100 according to the present embodiment will be described with reference to FIGS. 11 to 13.

The first control processing is premised only upon a touch operation on the display screen being detected. In contrast, the third control processing is control processing in which a user operation is enabled or disabled depending on the display state of the currently displayed image when a touch operation is detected as well as when a non-touch operation using an operation unit (such as a button) other than the touch panel of the display unit 105 is detected, as the user operation performed with respect to the currently displayed image. This makes it possible to notify the user that processing corresponding to the touch operation as well as the non-touch operation performed with respect to the display screen will not be performed.

Figure 13:
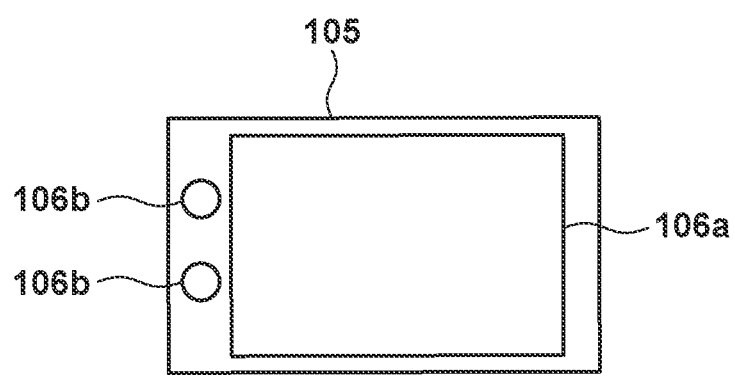
FIG. 13 is a schematic external view of a display unit in which input devices other than a touch panel are provided.

FIG. 13 is a schematic external view of the display unit 105 illustrating a configuration in which an input device for operating the display screen is provided in the display unit 105 in addition to a touch panel. The display unit 105 includes buttons 106b by the side of the display screen in addition to the touch panel 106a. The buttons 106b are operation members for specifying an arbitrary position on the display screen, and the user can perform an operation with respect to a currently displayed image by operating the buttons 106b.

Figure 11:
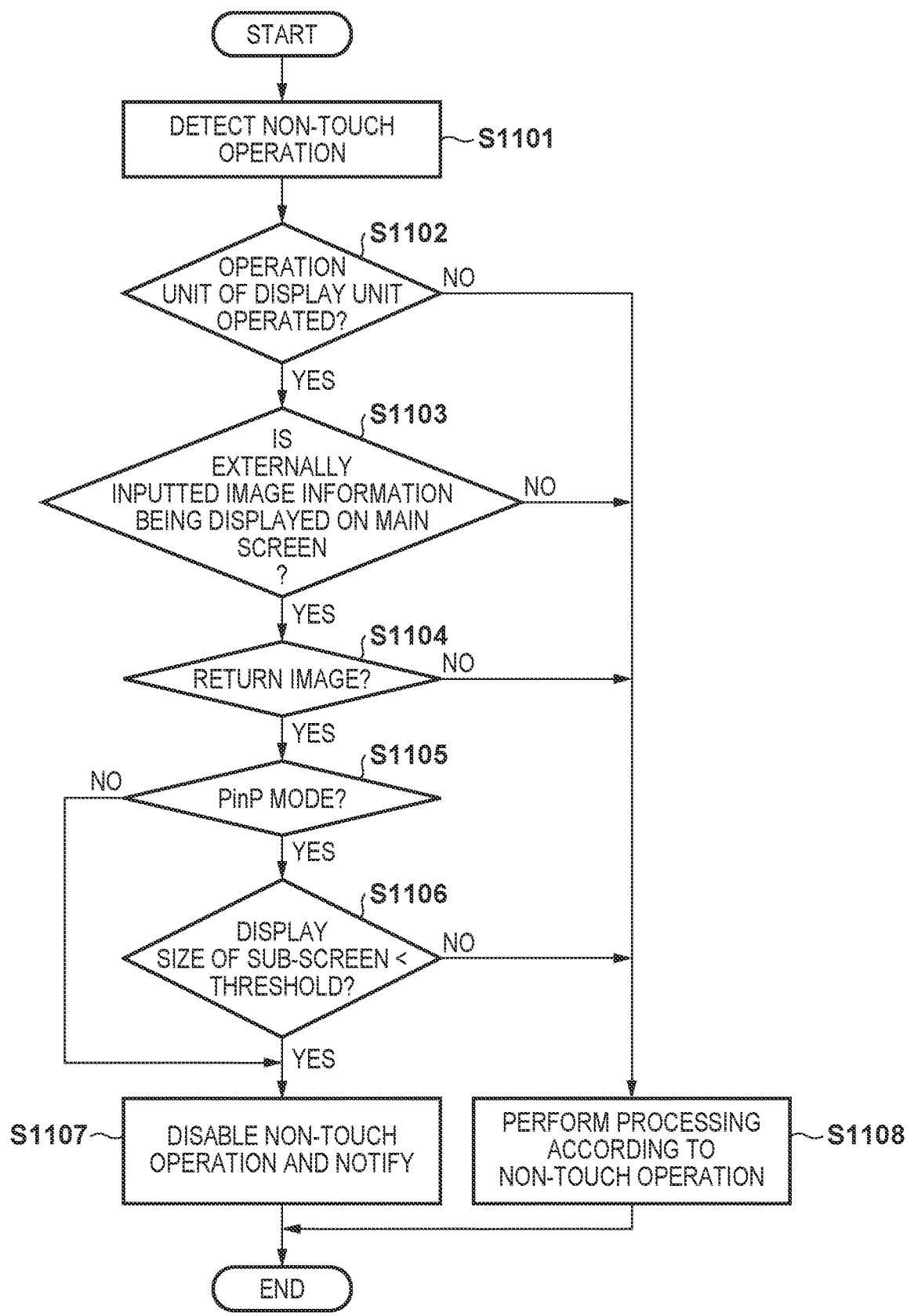
FIG. 11 is a flowchart illustrating third control processing according to the present embodiment.

FIG. 11 is a flowchart illustrating the third control processing by the image capturing apparatus 100 according to the present embodiment.

The processing of step S1103 to step S1105 of FIG. 11 is similar to the processing of step S703 to step S705 of FIG. 7.

In step S1101, the control unit 101 detects a user operation on the display screen of the display unit 105, using the operation unit 106.

In step S1102, the control unit 101 determines whether the user operation detected in step S1101 has been inputted from an operation unit (buttons 106b) other than the touch panel of the display unit 105. The control unit 101 advances the processing to step S1103 when the control unit 101 determines that the user operation detected in step S1101 has been inputted from an operation unit (buttons 106b) other than the touch panel of the display unit 105. The control unit 101 advances the processing to step S1108 when the control unit 101 determines that the user operation detected in step S1101 has not been inputted from an operation unit (buttons 106b) other than the touch panel of the display unit 105, that is, the user operation is an input operation on an operation unit provided not in the display unit 105 but in the image capturing apparatus 100.

Figure 12A:
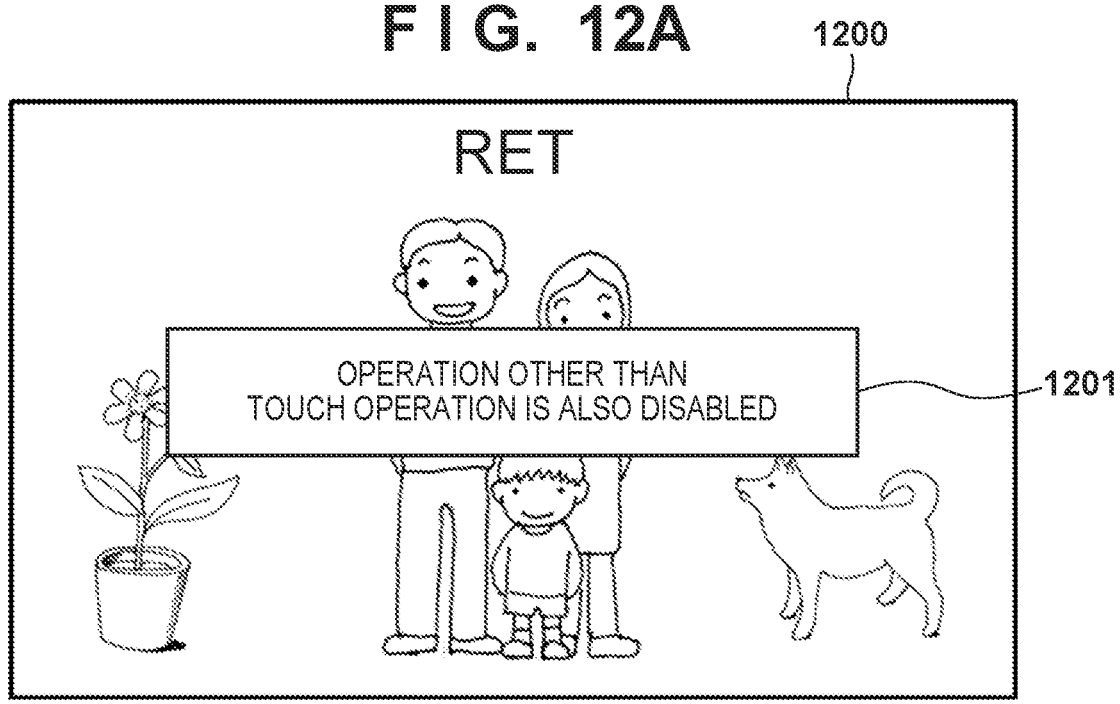

In step S1107, the control unit 101 disables the user operation detected in step S1101, displays a message notifying the user that processing according to the user operation has not been performed as illustrated in FIG. 12A or 12B, and ends the processing. When a return image is displayed on the display unit 105, triggered by an input operation other than a touch operation (such as an operation on a button) being detected, the processing may be terminated without the processing of step S1107 being performed.

In step S1108, the control unit 101 enables the user operation detected in step S1101, performs processing according to the user operation detected in step S1101, and ends the processing.

FIGS. 12A and 12B illustrate examples of screen displays for when a user operation performed with respect to a currently displayed image is disabled in step S1107 of FIG. 11.

A screen 1200 of FIG. 12A exemplifies a state in which a message 1201 is being displayed to notify the user that a user operation performed with respect to a currently displayed image has been disabled when the user operation has been detected in the non-PinP mode. The screen 1200 indicates an example of a display of a state (YES in step S1104 and NO in step S1105 of FIG. 11) in which a return image is being displayed on the main screen of the display unit 105. By viewing the message 1201, the user can recognize that processing according to the user operation has not been performed.

A screen 1202 of FIG. 12B exemplifies a state in which a message 1206 is being displayed to notify the user that a user operation performed with respect to a currently displayed image has been disabled when the user operation has been detected in the PinP mode. The screen 1202 indicates an example of a display in a state (YES in step S1106 of FIG. 11) in which a captured image 1204 is superimposed and displayed as a sub-screen on a return image 1203 being displayed on the main screen of the display unit 105 and a display size of the captured image 1204 is less than a region of a threshold 1205. By viewing the message 1206, the user can recognize that processing according to the user operation has not been performed.

In the examples of FIGS. 12A and 12B, although notification to the user is performed by a message being displayed on the display screen, a notification method other than a message may be used, such as notification with an icon.

The threshold 1205 illustrated in FIG. 12B is visualized in order to facilitate understanding and is not displayed on an actual screen.

As described above, by virtue of the present embodiment, it is possible to prevent unintended processing from being performed by the user erroneously performing an operation with respect to currently displayed image information.

In the present embodiment, in step S1102, the control unit 101 determines whether a user operation has been performed on an operation unit provided in the display unit 105 or on an operation unit provided in the image capturing apparatus 100, and when the control unit 101 determines that the user operation is performed on an operation unit provided in the image capturing apparatus 100, the user operation is enabled. However, regarding a user operation on an operation unit other than the touch panel, a configuration may be taken so as to enable an input operation for executing a particular function for allowing an operation while a return image is being displayed and disable other input operations. For example, a configuration may be taken so as to enable an input operation on an operation unit for switching an image displayed on the display unit 105 from a return image to an image (live view image) captured by the image capturing unit 110 but disable, for example, an input operation on an operation unit for image shooting settings (image shooting parameter settings) for the image capturing apparatus 100. Input operations on an operation unit, such as the touch panel 106a, become enabled in response to an image to be displayed on the display unit 105 being switched over to a captured image.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2022-118873, filed Jul. 26, 2022 which is hereby incorporated by reference herein in its entirety.

What is claimed is:

1. An image capturing apparatus comprising:
an image sensor; and
one or more processors or circuits executing instructions to cause the image capturing apparatus to operate as:
a detection unit configured to detect a user operation performed with respect to image information being displayed on a display; and
a control unit configured to determine whether externally inputted predetermined image information is being displayed on the display, and disable the user operation when the control unit determines that at least the externally inputted predetermined image information is being displayed on the display;
wherein the display is a display apparatus incorporated in the image capturing apparatus or a display apparatus connected as an external apparatus to the image capturing apparatus, and the detection unit detects a touch operation on a display screen of the display or an input operation other than the touch operation as the user operation, and
wherein even in a case where the touch operation on the display screen of the display is disabled, the control unit does not disable particular input operations other than the touch operation.

2. The apparatus according to claim 1, wherein
in a case where the predetermined image information is second image information different from first image information captured by the image sensor, the control unit disables the user operation.

3. The apparatus according to claim 2, wherein
the second image information is image information captured by an image capturing apparatus different from the image capturing apparatus.

4. The apparatus according to claim 1, wherein
in a case where an externally inputted return image captured by an image capturing apparatus different from the image capturing apparatus is being displayed, the control unit disables the user operation.

5. The apparatus according to claim 4, further comprising:
an interface configured to store, in a storage medium, image information captured by the image sensor, wherein
in a case where image information that has been externally inputted but read out from the storage medium is being displayed, the control unit does not disable the user operation.

6. The apparatus according to claim 3, wherein
in a case where the first image information is being superimposed and displayed on the second image information, at a display size smaller than that of the second image information, the control unit disables the user operation.

7. The apparatus according to claim 6, wherein
in a case where the first image information is being superimposed and displayed on the second image information, at a display size smaller than that of the second image information, and the display size of the first image information is greater than or equal to a predetermined threshold, the control unit disables the user operation.

8. The apparatus according to claim 7, wherein
in a case where an operation position of the user operation is inside a display region of the second image information, the control unit disables the user operation.

9. The apparatus according to claim 8, wherein
in a case where the operation position of the user operation is not inside a display region of the second image information, the control unit enables the user operation.

10. The apparatus according to claim 1, wherein
in a case where the user operation is detected and the user operation is disabled, the control unit notifies a user that the user operation has been disabled.

11. The apparatus according to claim 1, wherein
in a case where a user operation to be performed with respect to image information being displayed on the display is disabled regardless of whether the user operation has been detected, the control unit notifies the user that the user operation will be disabled.

12. The apparatus according to claim 1, wherein
in a case where a user operation to be performed with respect to image information being displayed on the display is enabled regardless of whether the user operation has been detected, the control unit notifies the user that the user operation will be enabled.

13. The apparatus according to claim 1, wherein
the particular input operations include an input operation for causing a live view image captured by the image sensor to be displayed on the display.

14. The apparatus according to claim 1, wherein
in a case where the touch operation on the display screen of the display is disabled, the control unit also disables predetermined input operations other than the touch operation.

15. The apparatus according to claim 14, wherein
the predetermined input operations include an input operation for setting an image shooting parameter.

16. The apparatus according to claim 1, further comprising:
a connection interface configured to connect an expansion apparatus for expanding a function of the image capturing apparatus.

17. A method of controlling an image capturing apparatus including an image sensor and a detection unit configured to detect a user operation performed with respect to image information being displayed on a display, the method comprising:
determining whether an externally inputted predetermined image information is being displayed on the display, and disabling the user operation in a case where the determining determines that at least the externally inputted predetermined image information is being displayed on the display;

wherein the display is a display apparatus incorporated in the image capturing apparatus or a display apparatus connected as an external apparatus to the image capturing apparatus, and the detection unit detects a touch operation on a display screen of the display or an input operation other than the touch operation as the user operation, and wherein even in a case where the touch operation on the display screen of the display is disabled, particular input operations other than the touch operation are not disabled.

18. A non-transitory computer-readable storage medium storing a program that when executed on a computer causes the computer to function as an image capturing apparatus comprising:

an image sensor; and one or more processors or circuits executing the program to cause the image capturing apparatus to operate as:

a detection unit configured to detect a user operation performed with respect to image information being displayed on a display; and a control unit configured to determine whether externally inputted predetermined image information is being displayed on the display, and disable the user operation when the control unit determines that at least the externally inputted predetermined image information is being displayed on the display;

wherein the display is a display apparatus incorporated in the image capturing apparatus or a display apparatus connected as an external apparatus to the image capturing apparatus, and the detection unit detects a touch operation on a display screen of the display or an input operation other than the touch operation as the user operation; and wherein even in a case where the touch operation on the display screen of the display is disabled, the control unit does not disable particular input operations other than the touch operation.

* * * * *